US011305936B2

(12) United States Patent
Sullivan et al.

(10) Patent No.: US 11,305,936 B2
(45) Date of Patent: Apr. 19, 2022

(54) COMMERCIAL LOGISTIC FACILITY, CONFIGURABLE MODULAR ROBOTIC AUTONOMOUS GUIDED VEHICLE, AND METHOD THEREFOR

(71) Applicant: Autoguide, LLC, Chelmsford, MA (US)

(72) Inventors: Robert Sullivan, Wilmington, MA (US); Justin Holwell, Sterling, MA (US); Paul Perry, Versailles, KY (US); William Fannin, Lexington, KY (US)

(73) Assignee: Autoguide, LLC, Chelmsford, MA (US)

( * ) Notice: Subject to any disclaimer, the term of this patent is extended or adjusted under 35 U.S.C. 154(b) by 167 days.

(21) Appl. No.: 16/586,040

(22) Filed: Sep. 27, 2019

(65) Prior Publication Data

US 2020/0102147 A1 Apr. 2, 2020

Related U.S. Application Data

(60) Provisional application No. 62/738,697, filed on Sep. 28, 2018.

(51) Int. Cl.
*G06F 7/00* (2006.01)
*B65G 1/137* (2006.01)

(52) U.S. Cl.
CPC .................. *B65G 1/1375* (2013.01)

(58) Field of Classification Search
CPC .................. B65G 1/1375; Y02P 90/60; G05B 2219/31003; G05B 2219/50393; G05B 19/41895; B66F 9/065; B66F 9/08; B66F 9/07513; B66F 9/063

USPC .......................................... 700/213–218, 228
See application file for complete search history.

(56) References Cited

U.S. PATENT DOCUMENTS

| 3,948,356 A | 4/1976 | Keene |
| 9,079,662 B1 | 7/2015 | Duffy et al. |
| 9,089,969 B1 | 7/2015 | Theobald |
| 9,098,367 B2 | 8/2015 | Ricci |

(Continued)

FOREIGN PATENT DOCUMENTS

| EP | 1731477 | 12/2006 |
| EP | 3495313 | 6/2019 |
| WO | 2015080685 | 6/2015 |

*Primary Examiner* — Yolanda R Cumbess
(74) *Attorney, Agent, or Firm* — Perman & Green, LLP

(57) ABSTRACT

A configurable modular robotic autonomous guided vehicle having an engine module and multiple different ones of selectably interchangeable logistic or material handling accessory modules. The engine module has motors, sensors and a control system integrated with each other for autonomous navigation freely throughout a travel area forming a logistic space. A module interface is located at one end of the engine module for modular coupling of the engine module with a handling accessory module of the vehicle. Each of the handling accessory modules has a different predetermined logistic or material handling characteristic that on integral coupling with the engine module define a different logistic or material handling autonomous guided vehicle type. Selectable coupling of the handling accessory module with the engine module configures the vehicle so as to change the vehicle type from a first vehicle type to a second vehicle type different than the first vehicle type.

36 Claims, 13 Drawing Sheets

(56) References Cited

U.S. PATENT DOCUMENTS

| | | |
|---|---|---|
| 9,352,745 B1 | 5/2016 | Theobald |
| 9,845,123 B2 * | 12/2017 | Byrnes .................... B60L 15/32 |
| 10,114,372 B1 | 10/2018 | Theobald |
| 2006/0155406 A1 | 7/2006 | Rossi et al. |
| 2012/0323431 A1 | 12/2012 | Wong et al. |
| 2016/0129958 A1 * | 5/2016 | Byrnes ..................... B60P 3/42 |
| | | 180/12 |
| 2016/0132059 A1 | 5/2016 | Mason et al. |
| 2016/0236867 A1 | 8/2016 | Brazeau |
| 2017/0017236 A1 * | 1/2017 | Song ....................... G08G 1/165 |
| 2017/0233231 A1 * | 8/2017 | Gariepy ............... G05D 1/0238 |
| | | 701/2 |

* cited by examiner

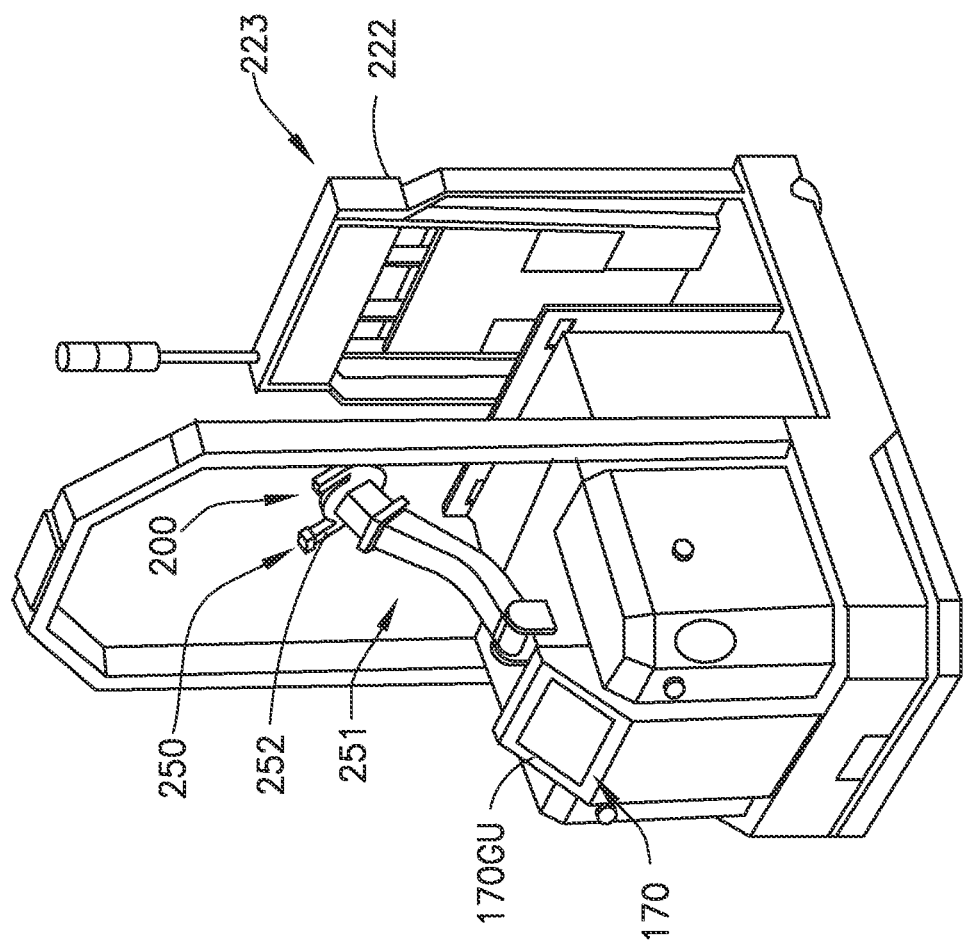
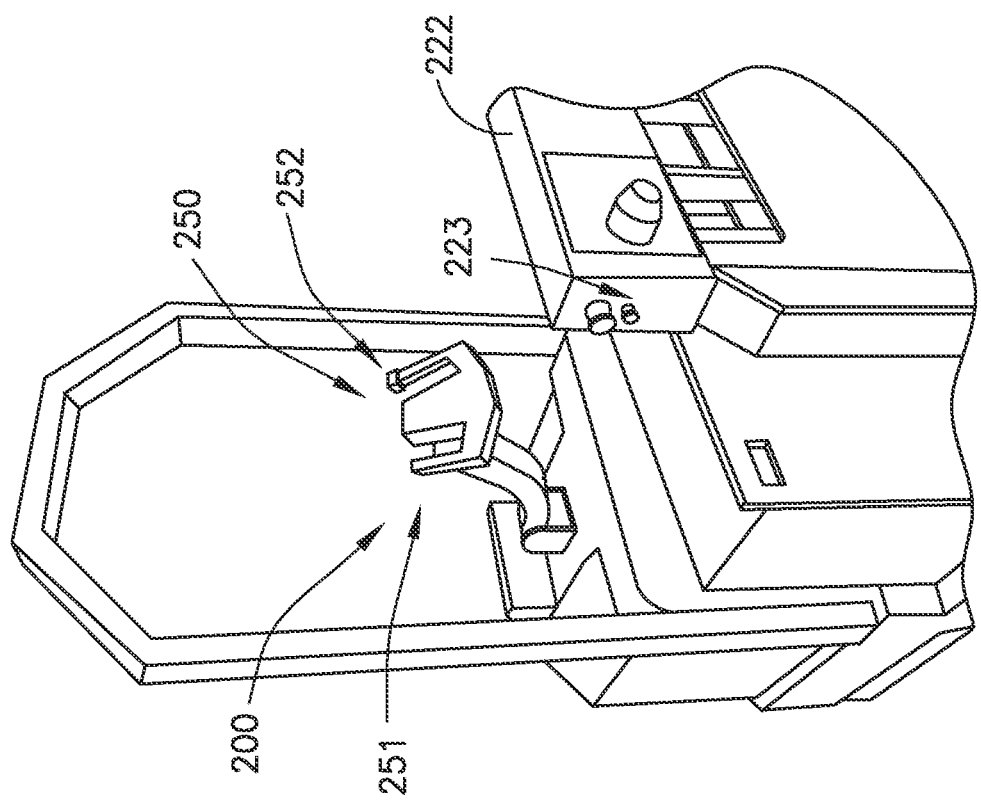

COMMERCIAL LOGISTIC FACILITY, CONFIGURABLE MODULAR ROBOTIC AUTONOMOUS GUIDED VEHICLE, AND METHOD THEREFOR

CROSS-REFERENCE TO RELATED APPLICATIONS

This application is a non-provisional of and claims the benefit of U.S. provisional patent application No. 62/738,697 filed on Sep. 28, 2018 and entitled "Configurable Modular Robotic Autonomous Guided Vehicle", the disclosure of which is incorporated herein by reference in its entirety.

BACKGROUND

1. Field

The exemplary embodiments generally relate to logistics and material handling in a commercial logistic facility, more particularly, to configurable automated logistics and material handling.

2. Brief Description of Related Developments

Generally transportation of goods in a commercial logistics facility is done with manually operated transport equipment such as fork lift-trucks, pallet jack-trucks, and with trailerable carts that are pulled behind a tugger vehicle. In some instances sensors are added to the transport equipment to provide some autonomous operation of the equipment. Further, the each piece of transport equipment is tailored to a specific operation (e.g., lifting, tugging, etc.) meaning that multiple pieces of equipment must be obtained for various operations.

BRIEF DESCRIPTION OF THE DRAWINGS

The foregoing aspects and other features of the disclosed embodiment are explained in the following description, taken in connection with the accompanying drawings, wherein:

FIG. 2B is another perspective illustration of the autonomous guided vehicle of FIG. 2A in accordance with aspects of the disclosed embodiment;

FIG. 2C is another perspective illustration of the autonomous guided vehicle of FIG. 2A in accordance with aspects of the disclosed embodiment;

DETAILED DESCRIPTION

It would be advantageous to have an intrinsically autonomous guided vehicle that is configured to perform various different transport operations in a fully autonomous, semi-autonomous, or manual mode.

Figure 1:
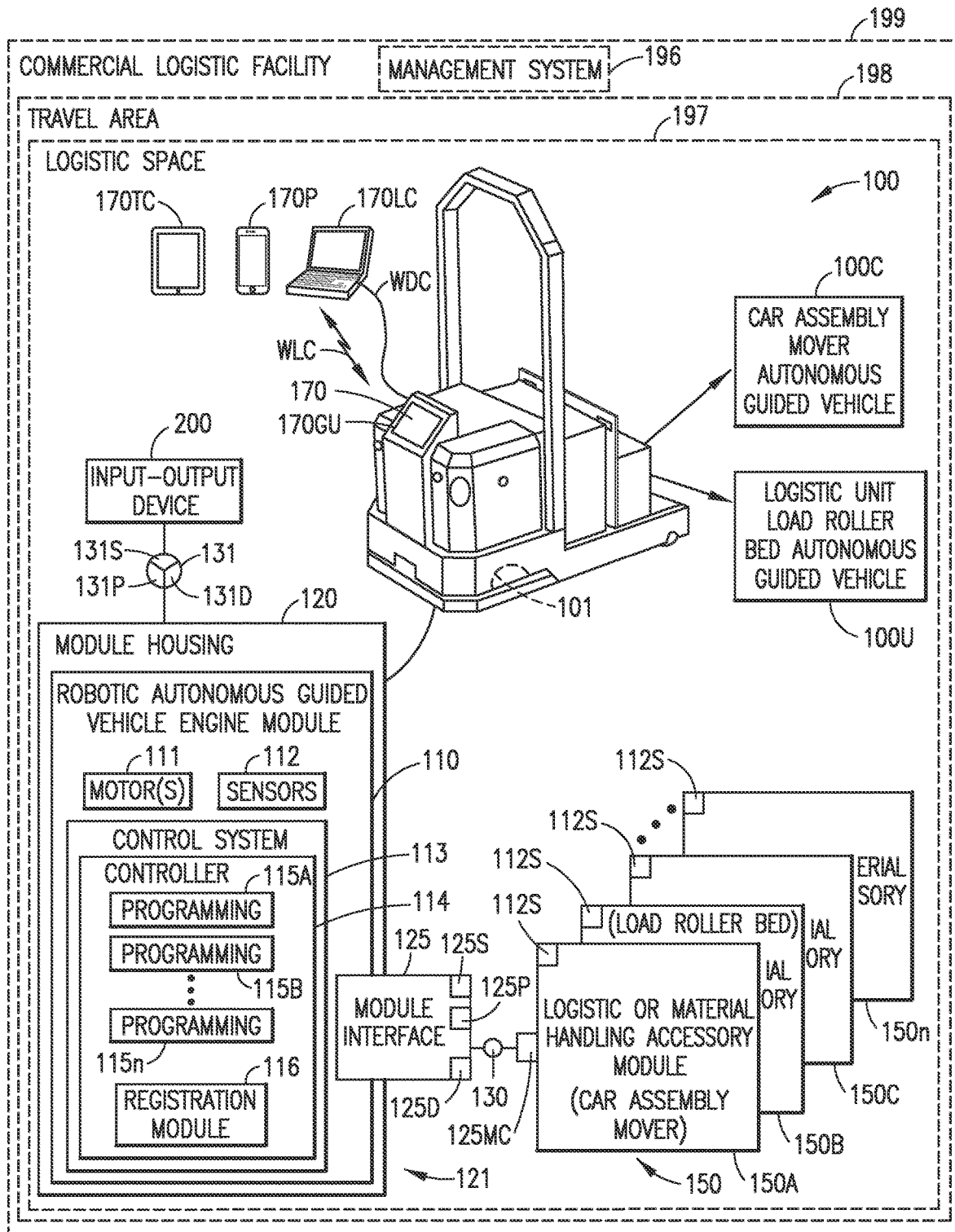
FIG. 1 is a perspective illustration of a configurable modular robotic autonomous guided vehicle (referred to herein as the "autonomous guided vehicle") in accordance with aspects of the disclosed embodiment.

Referring to FIG. 1, a configurable modular robotic autonomous guided vehicle 100 (referred to herein as "autonomous guided vehicle 100") is illustrated in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The autonomous guided vehicle 100 is configured for logistic and/or material handling in a commercial logistic facility 199. Examples of the commercial logistic facility 199 include, but are not limited to, warehouses, stores, storage and retrieval facilities, distribution facilities, and production/assembly facilities. In one aspect, such as where the autonomous guided vehicle 100 operates in a production/assembly facility (the production/assembly facility is used here for exemplary purposes only and it should be understood that the autonomous guided vehicle 100 may perform any suitable transport of goods depending on the facility in which the autonomous guided vehicle 100 operates), the autonomous guided vehicle may traverse a travel area in the production/assembly facility to transport objects from/to or between different fabrication zones in the production/assembly facility where each different fabrication zone has a different stage of goods fabrication, e.g., a subassembly from one fabrication stage is transferred to another fabrication stage for integration into a larger assembly/subassembly (such as in vehicle manufacturing). In another aspect, the autonomous guided vehicle may transfer the goods to a final assembly fabrication zone or to a shipping area for outbound transfer of the goods from the production/assembly facility.

The autonomous guided vehicle 100 includes a robotic autonomous guided vehicle engine module 110. The robotic autonomous guided vehicle engine module 110 includes motor(s) 111, sensors 112 and a control system 113 that are integrated with each other for autonomous navigation of the autonomous guided vehicle 100, freely throughout a travel area 198 of the commercial logistic facility 199. In one aspect, the travel area 198 forms a logistic space 197 of the commercial logistic facility 199; while in other aspects the travel area 198 forms any suitable space of the commercial logistic facility 199. The motor(s) 111 may be any suitable motors configured to drive one or more wheels or tracks 101 of the automated guided vehicle 100, either directly or through any suitable transmission, so that the automated guided vehicle 100 traverses, e.g., a floor, or any other suitable autonomous guided vehicle support surface, of the travel area 198. An example of a suitable robotic autonomous guided vehicle engine module is the AutoGuide MAX N10 mobile robot platform available from AutoGuide LLC, through any suitable autonomous guided vehicle may be used.

The sensors 112 may be any suitable sensors that are disposed at any suitable locations on the robotic autonomous guided vehicle engine module 110 to effect autonomous navigation of the autonomous guided vehicle 100 throughout the travel area 198. The sensors 112 include, but are not limited to, one or more of optical sensors, acoustic sensors, capacitive sensors, radio-frequency sensors, cameras having large fields of view, time of flight cameras, proximity imaging sensors/cameras, and/or any other suitable sensor(s) that provide(s) for the dynamic detection of obstacles, goods, personnel, docking stations, close coupling between the autonomous guided vehicle 100 (and its payload and/or accessory module) with manufacturing equipment, etc., and/or simultaneous localization and mapping (SLAM) (or other suitable navigation technique) within the commercial logistic facility 199.

The control system 113 is any suitable control system having at least one controller 114 that is configure with any suitable programming for effecting operation of the autonomous guided vehicle 100 as described herein. The controller 114 may also be configured, such as through wireless communications, to communicate with any suitable management system 196 of the commercial logistic facility 199 to effect fully autonomous operation of the autonomous guided vehicle 100. For example, the autonomous guided vehicle 100 is configured to receive, and the management system 196 of the commercial logistic facility 199 is configured to send, commands that instruct the autonomous guided vehicle 100 to perform predetermined tasks within the commercial logistic facility 199. Such tasks include but are not limited to, picking and placing goods, transporting goods, loading conveyance vehicle(s) 700 (see FIG. 7), or any other suitable task. The autonomous guided vehicle 100 may send task completed signals to the management system 196 for closing a task (marking the task complete) and to effect reassignment of the autonomous guided vehicle 100 to a subsequent task.

The autonomous guided vehicle 100, through the robotic autonomous guided vehicle engine module 110, is configured for intrinsic (i.e., wholly) autonomous navigation throughout the travel area 198, from any start location/point to any end destination location/point in the travel area 198. For example, the autonomous guided vehicle 100, through the autonomous guided vehicle engine module 110, relies on inherent structure (e.g., storage racks, assembly robots, conveyors, paint booths, assembly stations, etc.) of the commercial logistic facility 199 rather than specialized navigation infrastructure (e.g., line following, mechanical guidance, radio/electromagnetic beacons, magnets, codified marks/tape, etc.) for navigating through the travel area 198. For example, referring also to FIG. 8, the commercial logistic facility 199 includes logistic or material handling stations 800-805 (e.g., for logistic goods such as pallet storage locations, palletizer/depalletizer stations, conveyor infeed and/or outfeed stations, etc.) distributed throughout the travel area 198 of commercial logistic facility 199. The logistic or material handling stations 800-805 are disposed so as to form travel lanes or aisles 820, 821 between the logistic or material handling stations 800-805 so that each logistic or material handling stations 800-805 communicates with one or more other logistic or material handling stations 800-805 through the travel lanes or aisles 820, 821. The autonomous guided vehicles 100 travel within the travel lanes or aisles 820, 821 and between two or more of the travel lanes or aisles 820, 821 by relying on the intrinsic structure of, for example, the logistic or material handling stations 800-805 for the intrinsic (i.e., wholly) autonomous navigation of the autonomous guided vehicles 100 throughout the travel area 198.

Referring again to FIG. 1, the integrated motor(s) 111, sensors 112, and control system 113 are packaged within a module housing 120 forming the robotic autonomous guided vehicle engine module 110 as a module unit 121. The module unit 121 includes a module interface 125 at one end of the module unit 121 for modular coupling of the module unit 121 with a logistic or material handling accessory module 150A-150n (generally referred to as logistic or material handling accessory module 150) of the autonomous guided vehicle 100. The module interface 125 is communicably coupled to the controller 114 for at least registering the logistic or material handling accessory module 150 with the controller 114 as described herein.

Figure 4:
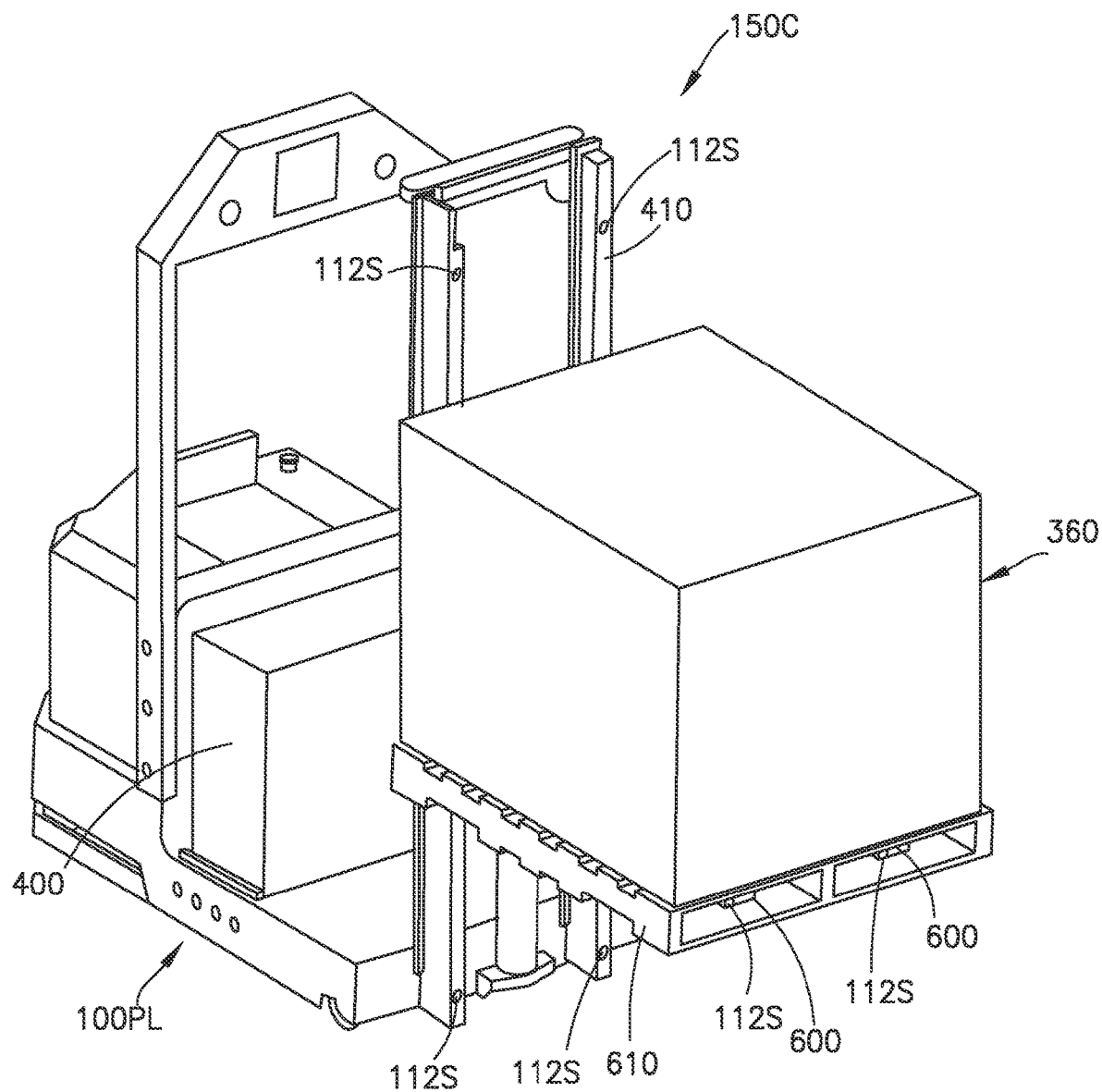
FIG. 4 is a perspective illustration of the autonomous guided vehicle of FIG. 1 in yet another modular configuration in accordance with aspects of the disclosed embodiment.
Figure 5:
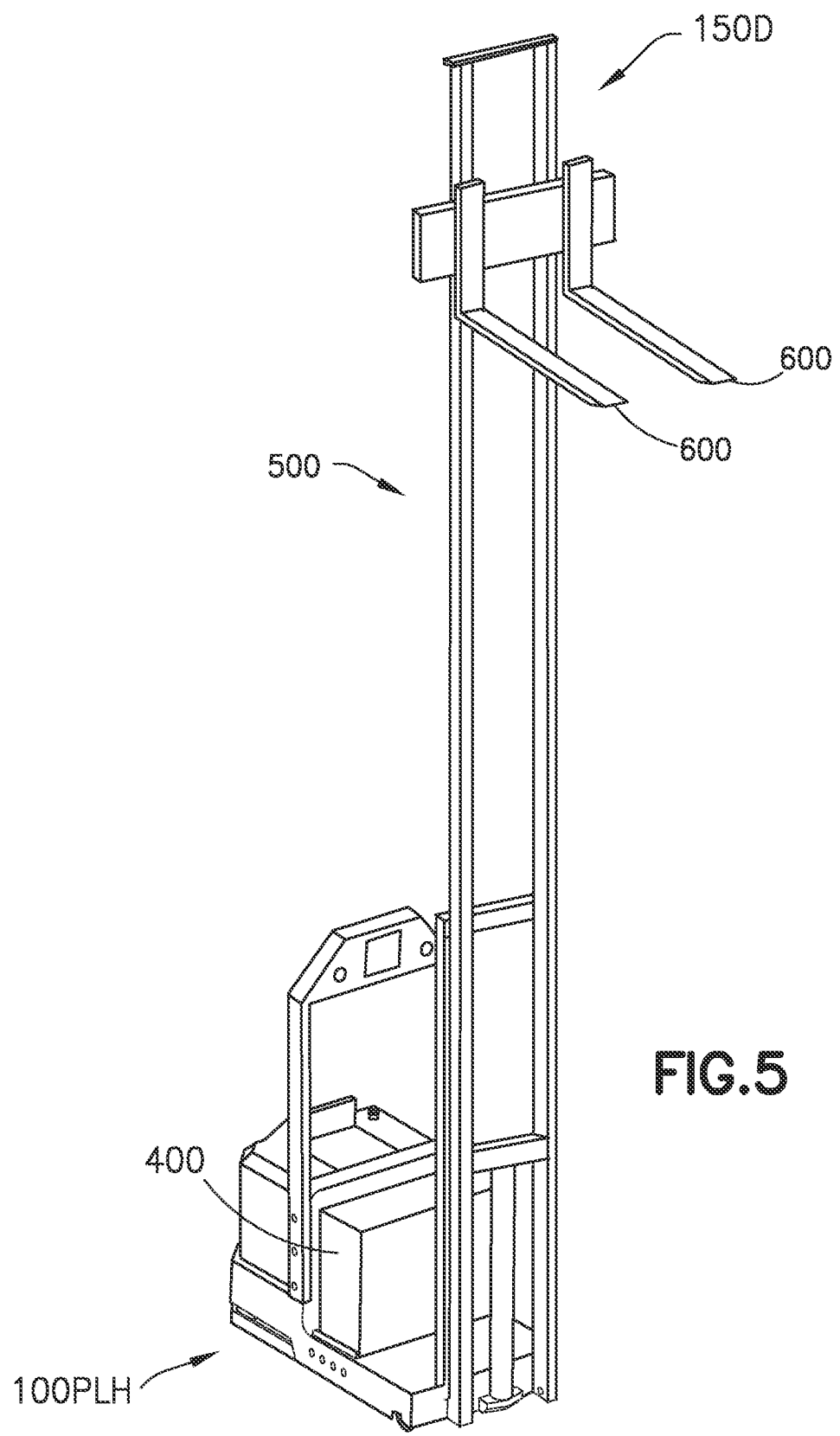
FIG. 5 is a perspective illustration of the autonomous guided vehicle of FIG. 1 in still another modular configuration in accordance with aspects of the disclosed embodiment.

Referring to FIGS. 1 and 3A-3D, in one aspect, the autonomous guided vehicle 100 has a built-in inherent logistic or material handling characteristic that defines a logistic or material handling autonomous guided vehicle type. For example, the module unit 121 is configured to define an integral (or inherent) predetermined logistic or material handling characteristic, different from the corresponding logistic or material handling characteristics of each of the logistic or material handling accessory modules 150. The integral predetermined logistic or material handling characteristic defines another logistic or material handling autonomous guided vehicle type different from each of the logistic or material handling autonomous guided vehicle types 100T (FIGS. 3A-D), 100PL (FIG. 4), 100PLH (FIG. 5), 100PJ (FIG. 6), 100C (FIG. 1), 100U (FIG. 1) that are described herein and defined from coupling respective logistic or material handling accessory modules 150A-150n with the module unit 121.

In one aspect, the inherent or integral logistic or material handling characteristic inherently defines the autonomous guided vehicle 100 as a tugger 100T (i.e., the inherent logistic or material handling autonomous guided vehicle type is a tugger); however in other aspects the tugger may be one of the different logistic or material handling accessory modules 150A-150n. In this aspect, the autonomous guided vehicle 100 of the tugger 100T type includes any tug coupling 300 at one end of the autonomous guided vehicle 100. The tug coupling 300 may be any suitable coupling that is configured to releasably couple with a payload 350 that is pulled or pushed by the autonomous guided vehicle 100. In one aspect, the tug coupling 300 is a fully autonomous coupling that automatically couples with and decouples from payload 350 (e.g., under the control of the control system 113); however, in other aspects the tug coupling 300 may also be configured for manual coupling and decoupling of the payload 350. The payload 350 may be any suitable powered or unpowered payload including, but not limited to a trailer, a carriage frame, a dolly, a cart or other towable/pushable structure holding any suitable logistics units 360 such as palletized goods, racks of goods, individual goods, bundles of goods, assemblies of goods, etc. Where the payload 350 is powered the tug coupling 300, in one aspect, the tug coupling may supply power from the autonomous guided vehicle 100 to the payload 350; while in other aspects, the tug coupling 300 is configured to actuate (e.g., upon coupling) a power system of the payload 350. In other aspects, the tugger 100T may not be the inherent or integral logistic or material handling characteristic inherently defined by the module unit 121 such that the tugger 100T is one of the other logistic or material handling autonomous guided vehicle type.

Figure 3A:
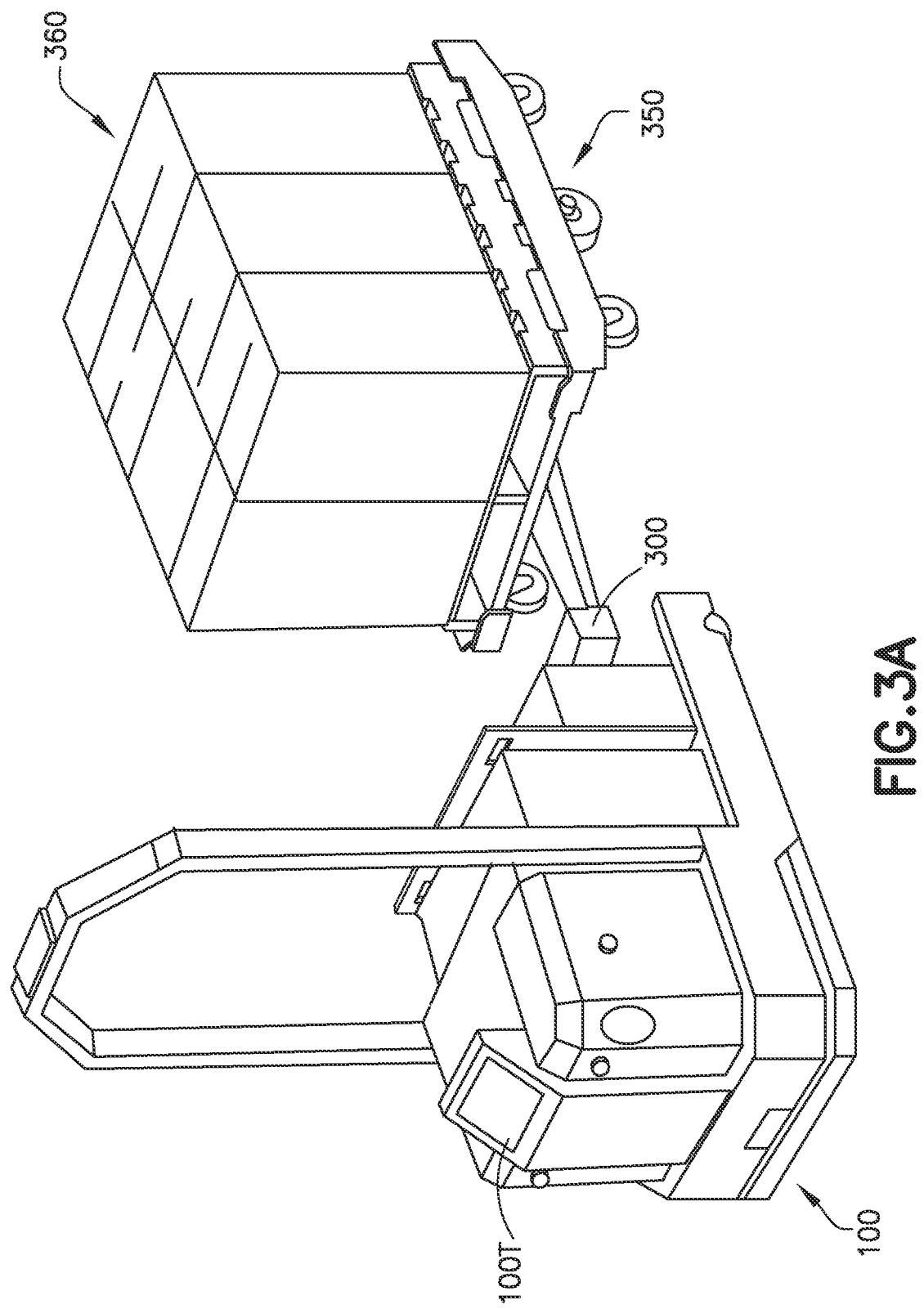
FIG. 3A is a perspective illustration of the autonomous guided vehicle of FIG. 1 in another modular configuration in accordance with aspects of the disclosed embodiment.
Figure 3B:
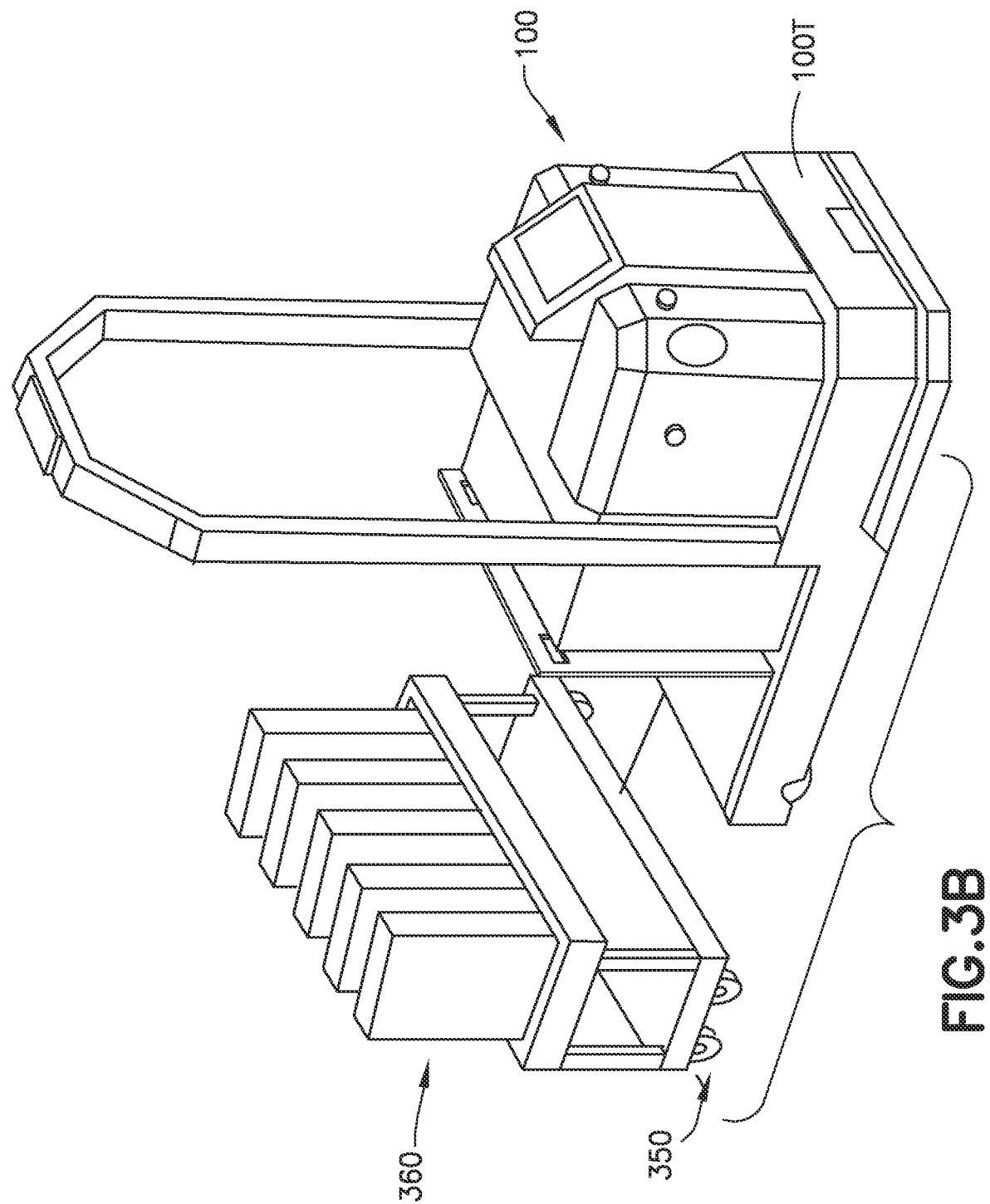
FIG. 3B is another perspective illustration of the autonomous guided vehicle of FIG. 3A in accordance with aspects of the disclosed embodiment.
Figure 3C:
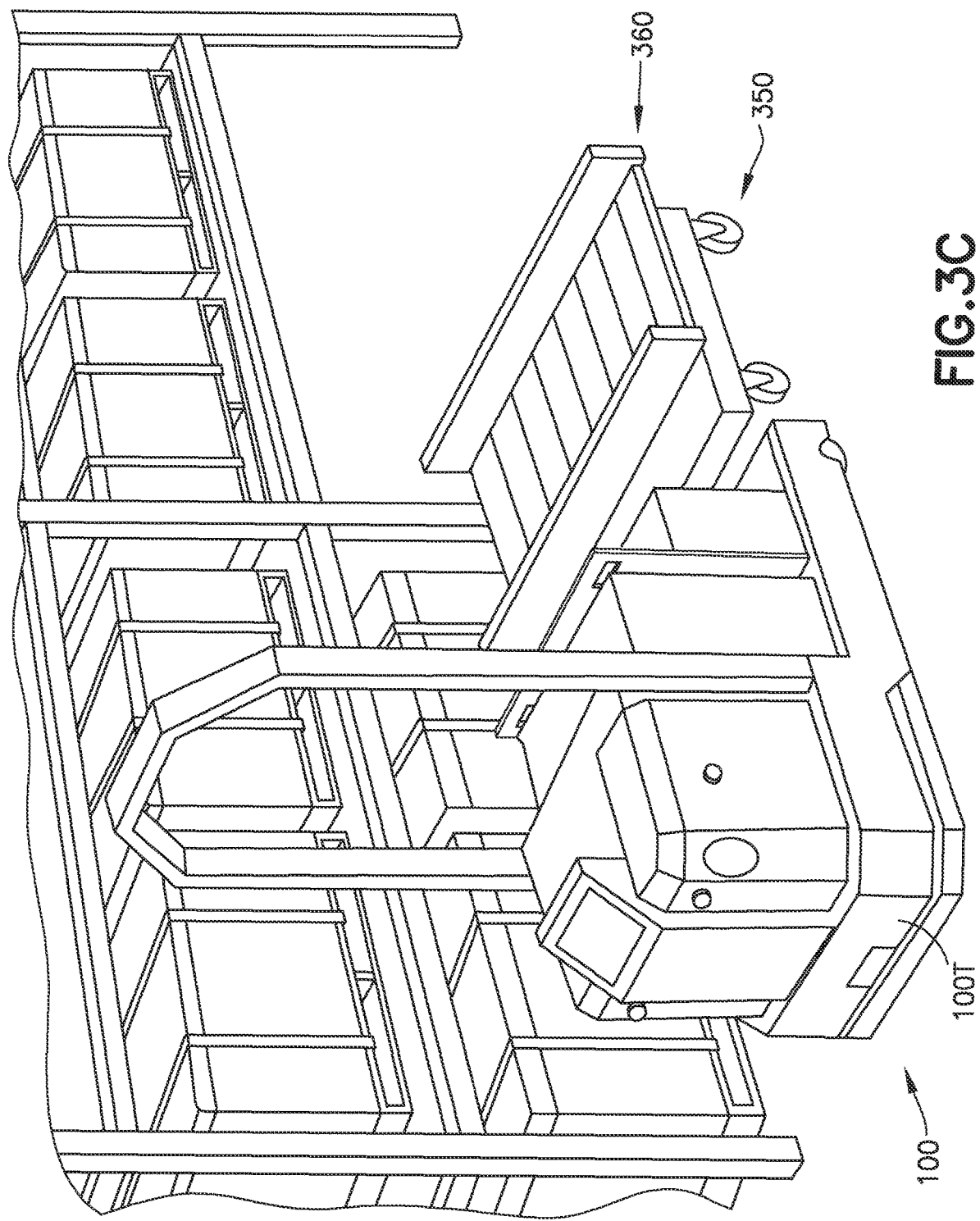
FIG. 3C is another perspective illustration of the autonomous guided vehicle of FIG. 3A in accordance with aspects of the disclosed embodiment.
Figure 3D:
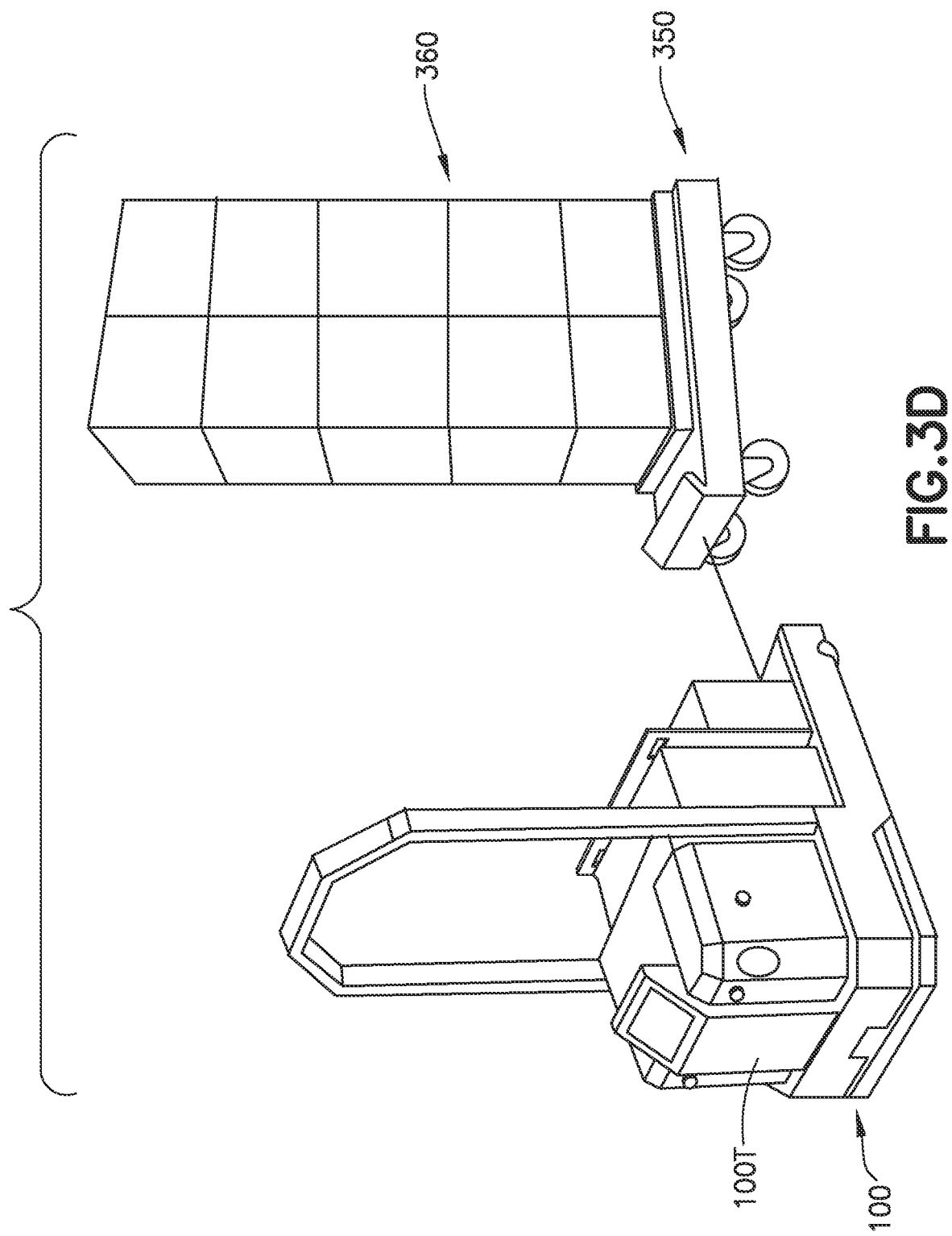
FIG. 3D is another perspective illustration of the autonomous guided vehicle of FIG. 3A in accordance with aspects of the disclosed embodiment.

FIGS. 3A, 3B, 3C, 3D are illustrative of the autonomous guided vehicle 100 of the tugger 100T type pulling and pushing payloads 350 (e.g., palletized goods on a trailer in FIGS. 3A and 3D, goods disposed on a rack in FIG. 3B, and a single good disposed on a trailer in FIG. 3C). As can be seen in FIG. 3D, the autonomous guided vehicle 100 is configured so as to manipulate the payload 350 so that the payload may be pushed or pulled in straight lines and/or around corners in operating environments with limited space. For example, the control system 113 may provide the autonomous guided vehicle 100 with navigational repeatability/accuracy of less than about half an inch and a docking repeatability/accuracy (such as where goods transported by the autonomous guided vehicle 100 are transferred to a logistic or material handling stations 800-805, see FIG. 8) of less than about a quarter of an inch.

Referring to FIG. 1, the logistic or material handling accessory module 150 includes multiple different logistic or material handling accessory modules 150A-150n. The multiple different logistic or material handling accessory modules 150A-150n are configured to as to be modularly coupled to the module unit 121 of the autonomous guided vehicle 100 through the module interface 125 in any suitable manner such as through suitable releasable mechanical and/or electrical couplings. A selectable coupling of the multiple different logistic or material handling accessory modules 150A-150n to the module unit 121 defines the autonomous guided vehicle 100 type. Each of the multiple different logistic or material handling accessory modules 150A-150n has a different predetermined logistic or material handling function, so that selectable coupling of a logistic or material handling accessory module 150A-150n to the module unit 121 defines the autonomous guided vehicle 100 type. For example, the autonomous guided vehicle 100 is inherently of the tugger 100T (FIGS. 3A-3D) type. Selective coupling of a different logistic or material handling accessory module 150A-150n to the module unit 121 changes the autonomous guided vehicle 100 from having the tugger type 100T (FIGS. 3A-3D) to a different type such as, for example, a forklift 100PL (FIG. 4) type.

Each of the multiple different logistic or material handling accessory modules 150A-150n have a corresponding different predetermined logistic or material handling characteristic that on integral coupling, of each different logistic or material handling accessory module 150A-150n, with the module unit 121 define a different logistic or material handling autonomous guided vehicle type. For example, at least one of the logistic or material handling accessory modules 150A (FIG. 1) has a corresponding predetermined logistic or material handling characteristic that defines a vehicle assembly mover autonomous guided vehicle 100C (FIG. 1) type. The vehicle assembly mover autonomous guided vehicle 100C includes any suitable vehicle lift that moves a complete car (e.g., automobile or other suitable wheeled or winged vehicle) from one location to another.

At least one of the logistic or material handling accessory modules 150B has a corresponding predetermined logistic or material handling characteristic that defines a logistic unit load roller bed autonomous guided vehicle 100U (FIG. 1) type. The logistic unit load roller bed autonomous guided vehicle 100U may be substantially similar to the tugger type; however, the logistic unit load roller bed autonomous guided vehicle 100U is configured to interface with and may be suitably configured so as to communicate with and have a close coupled interface with facility equipment (e.g., conveyors, robotics, etc.). The close coupled interface is such that the autonomous guided vehicle 100, the payload carried thereon, the logistic or material handling accessory module 150 coupled to the robotic autonomous guided vehicle engine module 110, and/or the payload carried by the logistic or material handling accessory module 150 is positioned by the autonomously guided vehicle 100 relative to the facility equipment to within the docking repeatability/accuracy described above. For example, the unit load roller bed autonomous guided vehicle 100U is configured so as to have a near deterministic pose (e.g., substantially similar to deterministic or relaxed deterministic positioning in two dimensions or three dimensions of a kinematic coupling) at an interface between the unit load roller bed autonomous guided vehicle 100U and, for example, a conveyor of the commercial logistic facility 199. Here, the unit load roller bed autonomous guided vehicle 100U, in effect, forms an extension of the conveyor so that items may be transferred between the unit load roller bed autonomous guided vehicle 100U and the conveyor. The unit load roller bed autonomous guided vehicle 100U provides communication (either wirelessly or through any suitable switch) to the conveyor indicating that the unit load roller bed autonomous guided vehicle 100U is close coupled with the conveyor and the unit load (e.g., engine cradles, vehicle sub-frames/assemblies, etc.) carried by the unit load roller bed autonomous guided vehicle 100U may be transferred from the unit load roller bed autonomous guided vehicle 100U to the conveyor.

Figure 7:
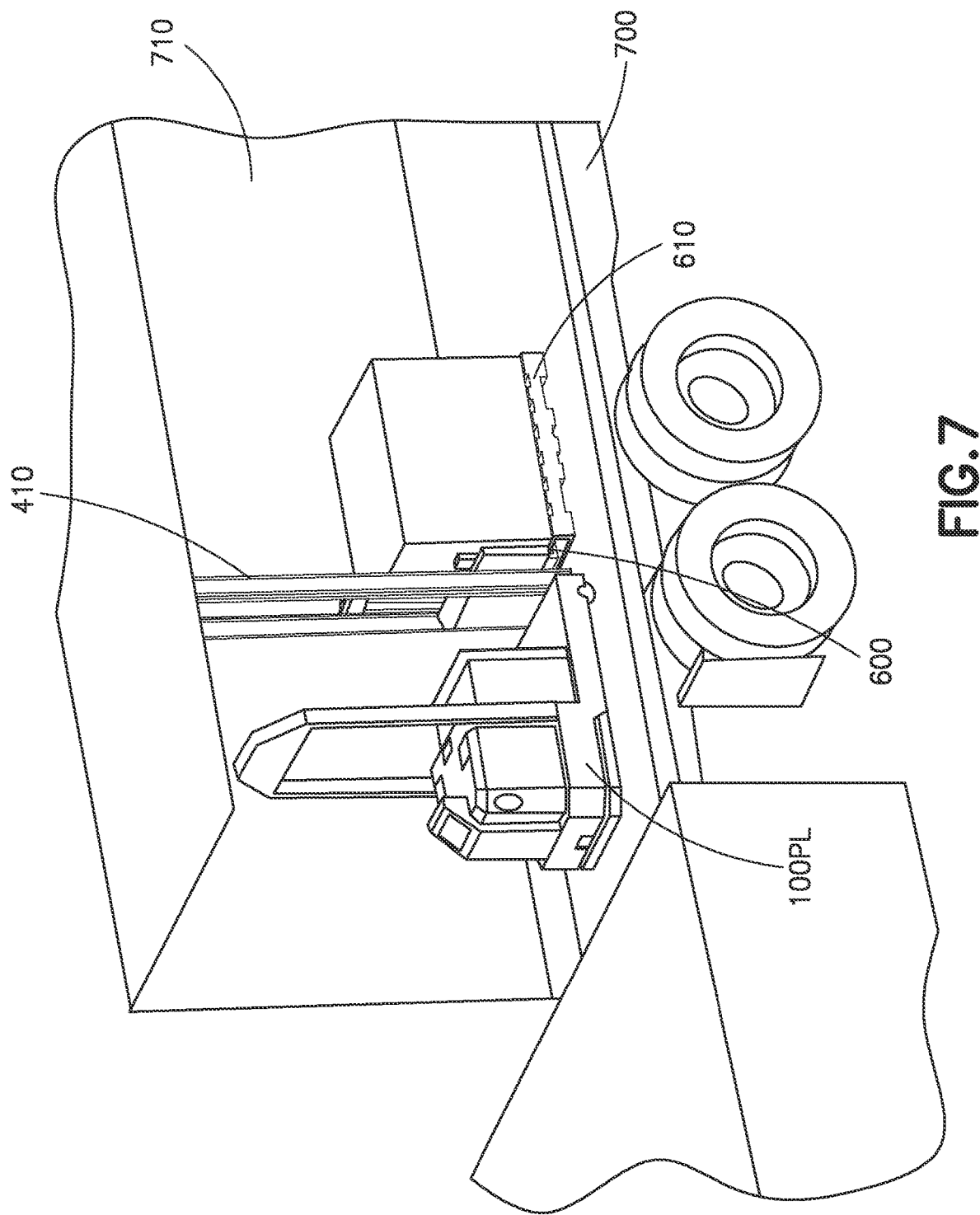
FIG. 7 is a perspective illustration of the autonomous guided vehicle of FIG. 1 operating within a conveyance vehicle in accordance with aspects of the disclosed embodiment.

At least one of the logistic or material handling accessory modules 150C (FIGS. 1 and 4) has a corresponding predetermined logistic or material handling characteristic that defines a pallet fork lift-truck (pallet stacker) autonomous guided vehicle 100PL (FIG. 4) type. The pallet fork lift-truck autonomous guided vehicle 100PL may have a standard fork truck mast 410 configuration that can stack pallet loads on top of one another, such as when stacking pallet loads in a conveyance vehicle 700 (FIG. 7).

At least one of the logistic or material handling accessory modules 150D (FIG. 5) has a corresponding predetermined logistic or material handling characteristic that defines a high bay pallet lift-truck autonomous guided vehicle 100PLH (FIG. 5) type. The high bay pallet lift-truck autonomous guided vehicle 100PLH includes a multistage mast 500 that reaches heights of about 38 feet (in other aspects the multistage mast 500 may reach higher than about 38 feet or less than about 38 feet) and provides for the three-dimensional distribution of loads, such as in multi-level warehouse storage racks.

Figure 6:
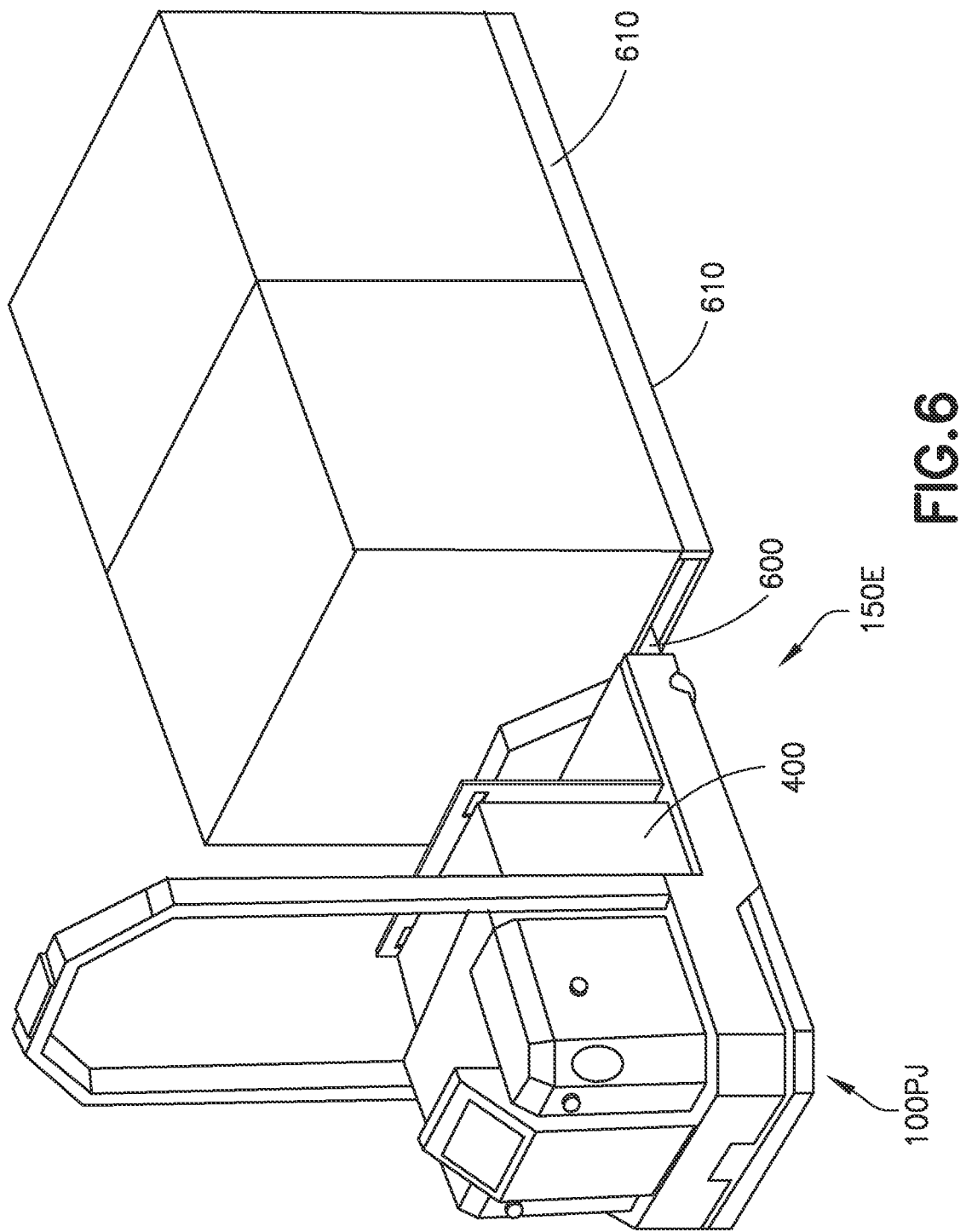
FIG. 6 is a perspective illustration of the autonomous guided vehicle of FIG. 1 in another modular configuration in accordance with aspects of the disclosed embodiment.

At least one of the logistic or material handling accessory modules 150E (FIG. 6) has a corresponding predetermined logistic or material handling characteristic that defines a pallet jack-truck autonomous guided vehicle 100PJ (FIG. 6) type. The pallet jack-truck autonomous guided vehicle 100PJ includes forks 600 that are configured to support one or more standard 48 in pallets 610. In one aspect, the forks 600 are configured to hold two or more standard 48 in pallets (for exemplary purposes only, FIG. 6 illustrates two standard 48 inch pallets being held by the forks 600).

In other aspects, any suitable autonomous guided vehicle type maybe defined by a corresponding one of the material handling accessory modules 150A-150n.

Where the autonomous guided vehicle type includes a lifting of goods with the autonomous guided vehicle 100 (such as with the pallet fork lift-truck autonomous guided vehicle 100PL (FIG. 4) type, the high bay pallet lift-truck autonomous guided vehicle 100PLH (FIG. 5) type, and the pallet jack autonomous guided vehicle 100PJ (FIG. 6) type) the autonomous guided vehicle 100 may include any suitable counterweights 400 (see FIGS. 4-6) disposed at any suitable location of the autonomous guided vehicle 100 to counterbalance a weight of the goods carried by the autonomous guided vehicle 100.

Each of the different logistic or material handling accessory modules 150A-150n are configured so as to be selectably interchangeable with each other and configured to selectably couple with module unit 121 via (e.g., through) the module interface 125. The coupling between the different logistic or material handling accessory modules 150A-150n and the module interface 125 is a releasable coupling 130 that may be effected with any suitable mechanical and/or electrical connections (e.g., a bolt on and/or plug in couplings). For example, the module interface 125 includes structural coupling(s) 125S, power coupling(s) 125P, and/or data communication coupling(s) 125D that mate or otherwise couple with corresponding mating couplings 125MC of the different logistic or material handling accessory modules 150A-150n. Coupling and decoupling of the mechanical and/or electrical connections of the releasable coupling 130 may be effected autonomously by the autonomous guided vehicle 100; or in other aspects manually or semi-autonomously. Where the coupling is autonomous or semi-autonomous, the module interface 125 is a deterministic coupling (e.g., a kinematic coupling) that is deterministic of the relative pose between the logistic or material handling accessory modules 150 and the robotic autonomous guided vehicle engine module 110. The deterministic coupling effects coupling of the structural coupling(s) 125S, power coupling(s) 125P, and/or data communication coupling(s) 125D with the corresponding mating couplings 125MC (e.g., corresponding mating structural coupling(s), power coupling(s), and/or data communication coupling(s)) of the different logistic or material handling accessory modules 150A-150n.

The module interface 125 and the robotic autonomous guided vehicle engine module 110 are configured such that the loads exerted on or generated by the different logistic or material handling accessory modules 150A-150n are supported by and distributed to the robotic autonomous guided vehicle engine module 110. The logistic or material handling accessory module(s) 150 is/are coupled to the robotic autonomous guided vehicle engine module 110 so as to depend from the robotic autonomous guided vehicle engine module 110 and move as a unit with the robotic autonomous guided vehicle engine module 110.

The selectable coupling of a logistic or material handling accessory module 150A-150n with the module unit 121 configures the autonomous guided vehicle 100 so as to change the logistic or material handling autonomous guided vehicle type from a first logistic or material handling autonomous guided vehicle type to a second logistic or material handling autonomous guided vehicle type that is different than the first logistic or material handling autonomous guided vehicle type. For example, in one aspect, the first logistic or material handling autonomous guided vehicle type is the tugger 100T autonomous guided vehicle 100 and the second logistic or material handling autonomous guided vehicle type is one of the car assembly mover autonomous guided vehicle 100C (FIG. 1) type, the logistic unit load roller bed autonomous guided vehicle 100U (FIG. 1) type, the pallet fork lift-truck autonomous guided vehicle 100PL (FIG. 4) type, the high bay pallet lift-truck autonomous guided vehicle 100PLH (FIG. 5) type, or the pallet jack autonomous guided vehicle 100PJ (FIG. 6) type.

Referring to FIG. 1, in one aspect, the module interface 125 and the control system 113 are communicably coupled and configured so as to allow the control system 113 to automatically (or in other aspects, manually) register the logistic or material handling accessory module 150 coupled with the module interface 125. For example, upon coupling of the module interface 125 with the logistic or material handling accessory module 150, one or more of the module interface 125 and the logistic or material handling accessory module 150 sends a signal to the control system 113 identifying the logistic or material handling accessory module 150. In other aspects the control system 125 may interrogate one or more of the module interface 125 and the logistic or material handling accessory module 150 to determine/identify the logistic or material handling accessory module 150. In still other aspects, the module unit 121 may include any suitable sensors that interact (either with contact or without contact) with one or more of the module interface 125 and the logistic or material handling accessory module 150 to identify the logistic or material handling accessory module 150. Under manual or semiautomatic registration, a suitable input, manual, or remote may be entered in the control system 113 identifying the logistic or material handling accessory module 150 to be coupled, and the control system 113 registers the logistic or material handling accessory module 150 so that coupling is complete when effected. The control system 113 registers the identification of the logistic or material handling accessory module 150 in any suitable memory, such as a registration module 116, of the controller 114 and changes the logistic or material handling autonomous guided vehicle type based on the registered logistic or material handling accessory module 150.

The controller 114 of the control system 113 is configured with different predetermined autonomous navigation programming 115A-115n having different predetermined autonomous navigation characteristics corresponding to the logistic or material handling autonomous guided vehicle type. Each of the different predetermined autonomous navigation programming effects at least control of the logistic or material handling accessory module 150, by the control system 113, according to the logistic or material handling autonomous guided vehicle type registered in the registration module 116 upon coupling of the logistic or material handling accessory module 150 to the module interface 125. Based on the logistic or material handling autonomous guided vehicle type configured with the module interface 125, the controller 114 is configured to access a corresponding autonomous navigation program 115A-115n for the logistic or material handling autonomous guided vehicle type registered. In this aspect, the autonomous guided vehicle 100 is self-configuring. For example, the autonomous guided vehicle 100 is configured to automatically select the corresponding autonomous navigation program 115A-115n for the logistic or material handling autonomous guided vehicle type registered. Automatic selection of the corresponding autonomous navigation program 115A-115n provides one or more of: (1) a transfer of power, (2) a transfer of data, and (3) commands between the logistic or material handling accessory module 150 and the robotic autonomous guided vehicle engine module 110. For example, where the logistic or material handling accessory modules 150C (FIG. 4) is coupled to the module interface 125 to configure the autonomous guided vehicle 100 as a pallet fork lift-truck autonomous guided vehicle 100PL (FIG. 4), the controller 114 selects an autonomous navigation program 115A-115n corresponding to pallet fork lift-truck autonomous guided vehicle 100PL (FIG. 4) type. Selection of the autonomous navigation program 115A-115n corresponding to pallet fork lift-truck autonomous guided vehicle 100PL (FIG. 4) type provides control power, data, and commands to the logistic or material handling accessory modules 150C for the operation of the fork lift-truck autonomous guided vehicle 100PL (e.g., sensor data, power, and control commands may be shared between the logistic or material handling accessory module 150 and the robotic autonomous guided vehicle engine module 110 for the operation of the fork lift-truck autonomous guided vehicle 100PL).

In other aspects, the autonomous guided vehicle 100 includes an operator interface 170 that is communicably coupled (either wirelessly or through a wired coupling) to the control system 113 and configured to provide manual configuration of the autonomous guided vehicle 100 (e.g., manual registration of the logistic or material handling accessory modules 150 and/or manual selection of the autonomous navigation program 115A-115n) configured in each of the logistic or material handling autonomous guided vehicle types as previously described. The operator interface 170 may be any suitable interface including, but not limited to, graphical user interfaces 170GU built in to the autonomous guided vehicle 100, tablet computers 170TC, smart phones 170P, and laptop computers 170LC (FIG. 1) that are coupled to the autonomous guided vehicle through any suitable wireless connection WLC and/or wired connection WDC (FIG. 1).

As described above, the autonomous guided vehicle 100 is intrinsically constructed as a wholly autonomous guided vehicle. In one aspect, the autonomous guided vehicle 100 is configured so that the autonomous guided vehicle 100 is operator navigable (e.g., driven by an operator throughout the travel area 198 and/or is operable in a semi-autonomous mode). For example, referring to FIGS. 1 and 2A-2C the module housing 120 and control system 113 of the module unit 121 is configurable so as to couple a removable input-output device 200 to the robotic autonomous guided vehicle engine module 110. The input-output device 200 is configured for operator 210 (FIG. 2A) control of the autonomous guided vehicle 100, and changing the control system 113 from autonomous navigation intrinsic to the module unit 121 to operator assisted or operator controlled navigation.

The input-output device 200 is coupled to the module housing 120 and the control system 113 through a releasable coupling 131 that includes a structural support 131S, power coupling(s) 131P, and/or data communication coupling(s) 131D. The structural support 131S couples the input-output device 200 to the module housing 120 so that the input-output device 200 depends from the robotic autonomous guided vehicle engine module 110. The power coupling(s) 131P provide a transfer of power from the robotic autonomous guided vehicle engine module 110 to the input-output device 200 for powering any electronics 250 (e.g., displays, switches, steering inputs, etc.) that may be included on/in the input-output device 200. The electronics 250 are configured to effect operation of (1) the autonomous guided vehicle 100 and (2) any logistic or material handling accessory modules 150 coupled thereto according to the configured logistic or material handling autonomous guided vehicle type. For example, the electronics are configured to effect operation of switches or buttons 252 for the raising and lowering of forks 600 and a steering yoke/wheel 251 for steering the autonomous guided vehicle 100 along an operator defined path. The data communication coupling (s) 131D provide communication between the input-output device 200 and the control system 113. The data communication coupling(s) 131D transfer operator input commands from the input-output device 200 to the control system 113 for operating the autonomous guided vehicle 100 and any logistic or material handling accessory modules 150 coupled thereto. The input-output device 200 may be coupled to the autonomous guided vehicle 100 at any suitable time, such as during manufacture of the autonomous guided vehicle 100 or as a retrofit installation after the autonomous guided vehicle has been placed in service. Configuring the logistic or material handling autonomous guided vehicle type as described before causes the controller 114 to respectively enable and disable corresponding manual controls so as to conform to the configured logistic or material handling autonomous guided vehicle type registered by the controller 114.

In this aspect, the autonomous guided vehicle 100 includes an operator station 220 that includes an operator support surface 221. In other aspects, the operator station 220 may also include a railing 222 coupled to the robotic autonomous guided vehicle engine module 110. The railing 222 may include any suitable electronics 223 (e.g., start buttons, stop buttons, lights, etc.) communicably coupled to the control system 113 and configured to, for example, interrupt operation of the autonomous guided vehicle 100 (e.g., emergency stop), start up the autonomous guided vehicle 100 from an off/inoperable state, and/or provide an operational status of the autonomous guided vehicle (e.g., through different color lights 224). The railing 222 may form, with the module housing 120, an operator compartment in which the operator 210 is disposed while operating the autonomous guided vehicle 100.

The operator support surface 221 may include one or more presence sensors 270 that in one aspect form an array of presence sensors 271 (e.g., a load pad 272). The one or more presence sensors 270 of the array of presence sensors 271 are communicably coupled to the control system 113 and provide sensor signals to, for example, the controller 114 to indicate the presence of an operator 210 on the operator support surface 221. The one or more presence sensors 270 and/or the railing 222 may be coupled to the autonomous guided vehicle 100 at any suitable time, such as during manufacture of the autonomous guided vehicle 100 or as a retrofit installation after the autonomous guided vehicle has been placed in service. In one aspect, one or more of the railing 222 and one or more presence sensors 270 may be built in to the module housing 120.

The controller 114 is configured to receive the sensor signals from the one or more presence sensors 270 of the array of presence sensors 271 and switch the autonomous guided vehicle 100 to operator assisted or operator controlled navigation upon detection of the operator 210 on the operator support surface 221. The controller 114 is configured to automatically return the autonomous guided vehicle 100 to the intrinsic fully autonomous operation when the operator is no longer detected on the operator support surface 221. In this aspect, the autonomous guided vehicle 100 may operate under operator assisted navigation where the autonomous guided vehicle 100 navigates autonomously over a portion of a task (e.g., transfer of loads) to be completed and under operator control over another portion of the task to be completed (such as picking and placing loads within a conveyance vehicle 70—FIG. 7) where the autonomous guided vehicle 100 is switched between autonomous navigation and operator navigation by the operator 210 entering the operator station 220 so as to be disposed on the operator support surface 221. In other aspects, the autonomous guided vehicle may operate under operator navigation where the autonomous guided vehicle 100 navigates under operator control over an entire portion of a task (e.g., transfer of loads) to be completed.

Figure 8:
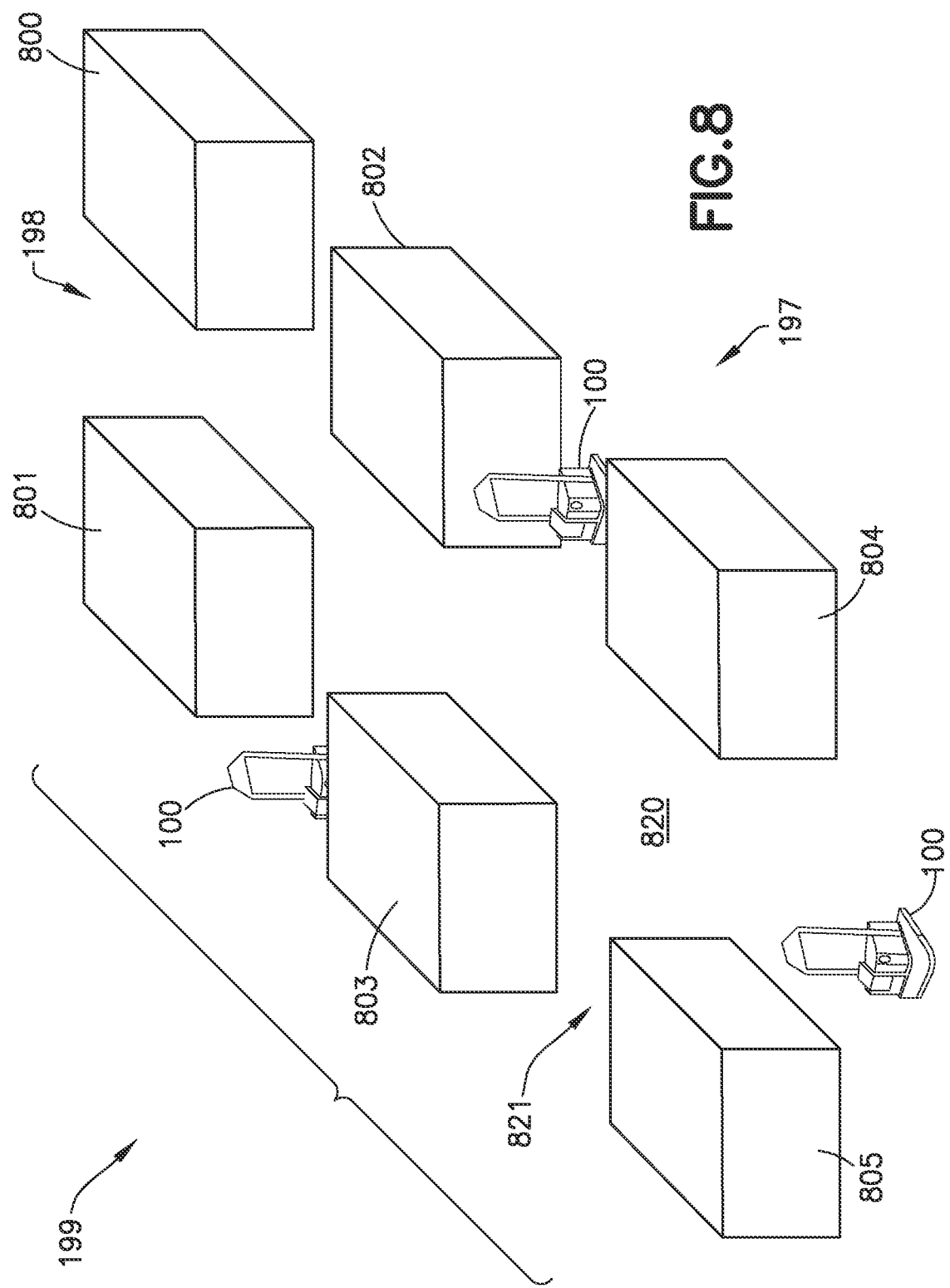
FIG. 8 is a perspective illustration of a portion of an exemplary commercial logistic facility in accordance with aspects of the disclosed embodiment.

Referring to FIGS. 1 and 7, the autonomous guided vehicle 100 may also automate loading and unloading of conveyance vehicles 700 (e.g., semi-trailers, box trucks, etc.). For example, the autonomous guided vehicle 100 is configured to navigate within the confines of a cargo compartment 710 of a conveyance vehicle 700. The cargo compartment 710 may be the interior of a trailer or box truck or any other suitable conveyance vehicle. The sensors 112 may be placed at suitable locations on the module housing 120 so as to navigate within the confines of the cargo compartment 710 with the navigational repeatability/accuracy and/or a docking repeatability/accuracy described above. The logistic or material handling accessory module 150 may also include supplemental sensors 112S that communicate with the control system 113 upon coupling of the logistic or material handling accessory module 150 with the module unit 121. The supplemental sensors 112S provide supplemental signals to the control system 113 for the detection of objects disposed within the travel path of the autonomous guided vehicle 100 that would otherwise be blocked by the payload carried, towed, or pushed by the autonomous guided vehicle 100. For example, using the forklift 100PL type autonomous guided vehicle 100 illustrated in FIG. 7, one or more of the mast 410 and forks 600 may include one or more supplemental sensors 112S (see FIG. 4) configured to aid autonomous navigation and placement of payload within the confines of the cargo compartment 710. As may be realized, the supplemental sensor 112S may also aid in the navigation and placement of payloads within the travel area 198 of the commercial logistic facility 199, such when transferring payload between the logistic or material handling stations 800-805 (FIG. 8).

Figure 9:
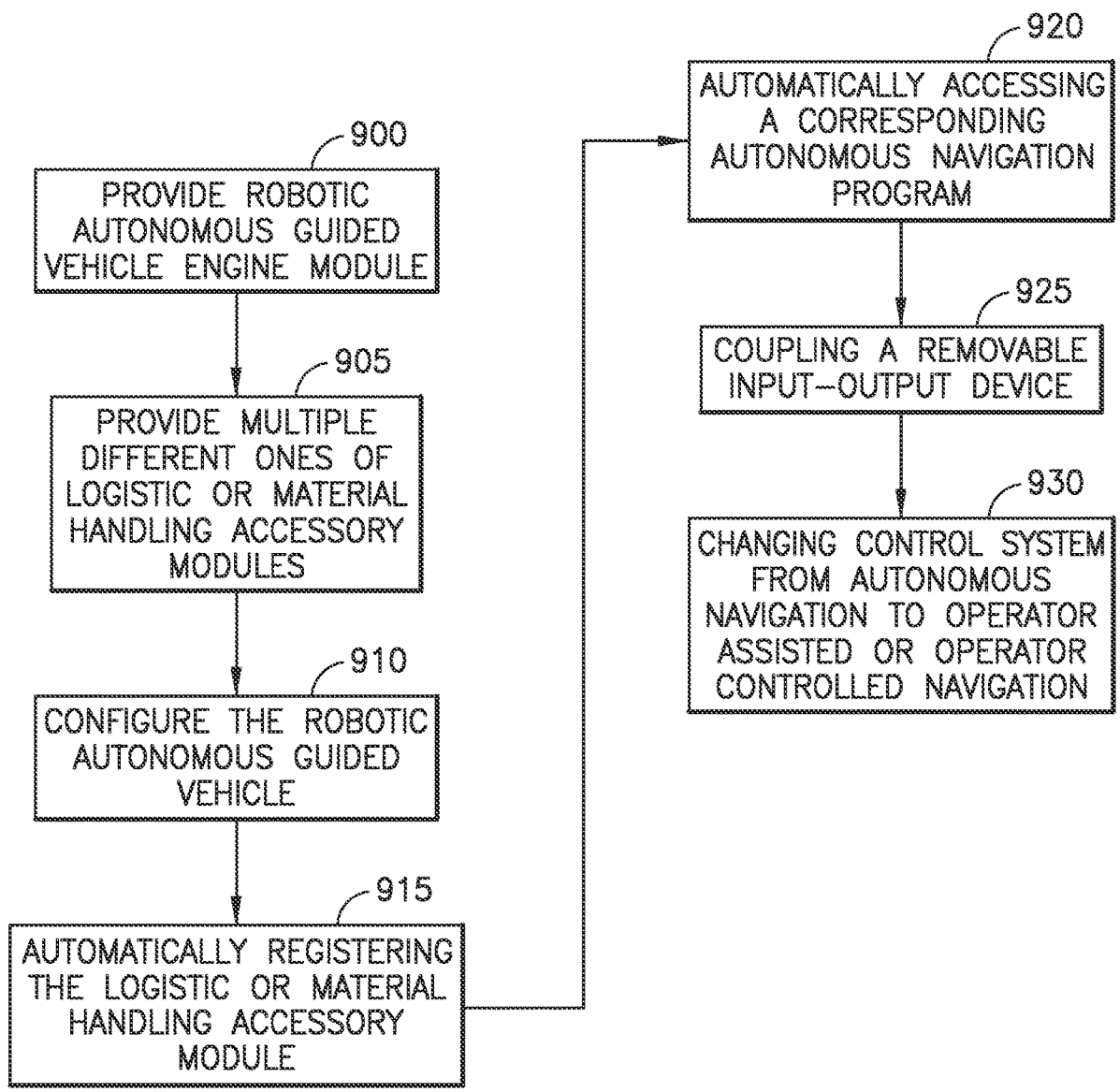
FIG. 9 is a flow diagram of a method in accordance with aspects of the present disclosure.

Referring to FIGS. 1 and 9 an exemplary method for transporting logistics units 360 (FIGS. 2A-4) with the autonomous guided vehicle 100 will be described in accordance with aspects of the disclosed embodiment. The autonomous guided vehicle engine module 110 (as described herein) is provided (FIG. 9, Block 900). Multiple different ones of the logistic or material handling accessory modules (s) 150 (as described herein) are provided (FIG. 9, Block 905). The autonomous guided vehicle 100 is configured (FIG. 9, Block 910) by selectably coupling one of the logistic or material handling accessory module(s) 150 with the module unit 121 so as to change the logistic or material handling autonomous guided vehicle type from a first logistic or material handling autonomous guided vehicle type to a second logistic or material handling autonomous guided vehicle type that is different than the first logistic or material handling autonomous guided vehicle type. For example, the autonomous guided vehicle 100 may have a base or intrinsic configuration that is the tugger 100T (FIGS. 3A-3D). Depending on a task assigned (e.g., by the management system 196 or manually by an operator) to the autonomous guided vehicle 100, one of the logistic or material handling accessory module(s) 150 corresponding to the assigned task is selected and coupled to the module unit 121 so as to reconfigure the autonomous guided vehicle to something other than the tugger 100T (FIGS. 3A-3D), such as for example, one of the other logistic or material handling autonomous guided vehicle types 100PL (FIG. 4), 100PLH (FIG. 5), 100PJ (FIG. 6), 100C (FIG. 1), 100U (FIG. 1) that are described herein.

As described above, the controller 114 automatically registers the logistic or material handling accessory module 150 (FIG. 9, Block 915) coupled with the module interface 125, and the logistic or material handling autonomous guided vehicle type configured with the module interface 125. The controller 114 automatically accesses a corresponding autonomous navigation program 115A-115n for the logistic or material handling autonomous guided vehicle type registered so as to effect completion of the autonomous guided vehicle 100 reconfiguration.

Figure 2A:
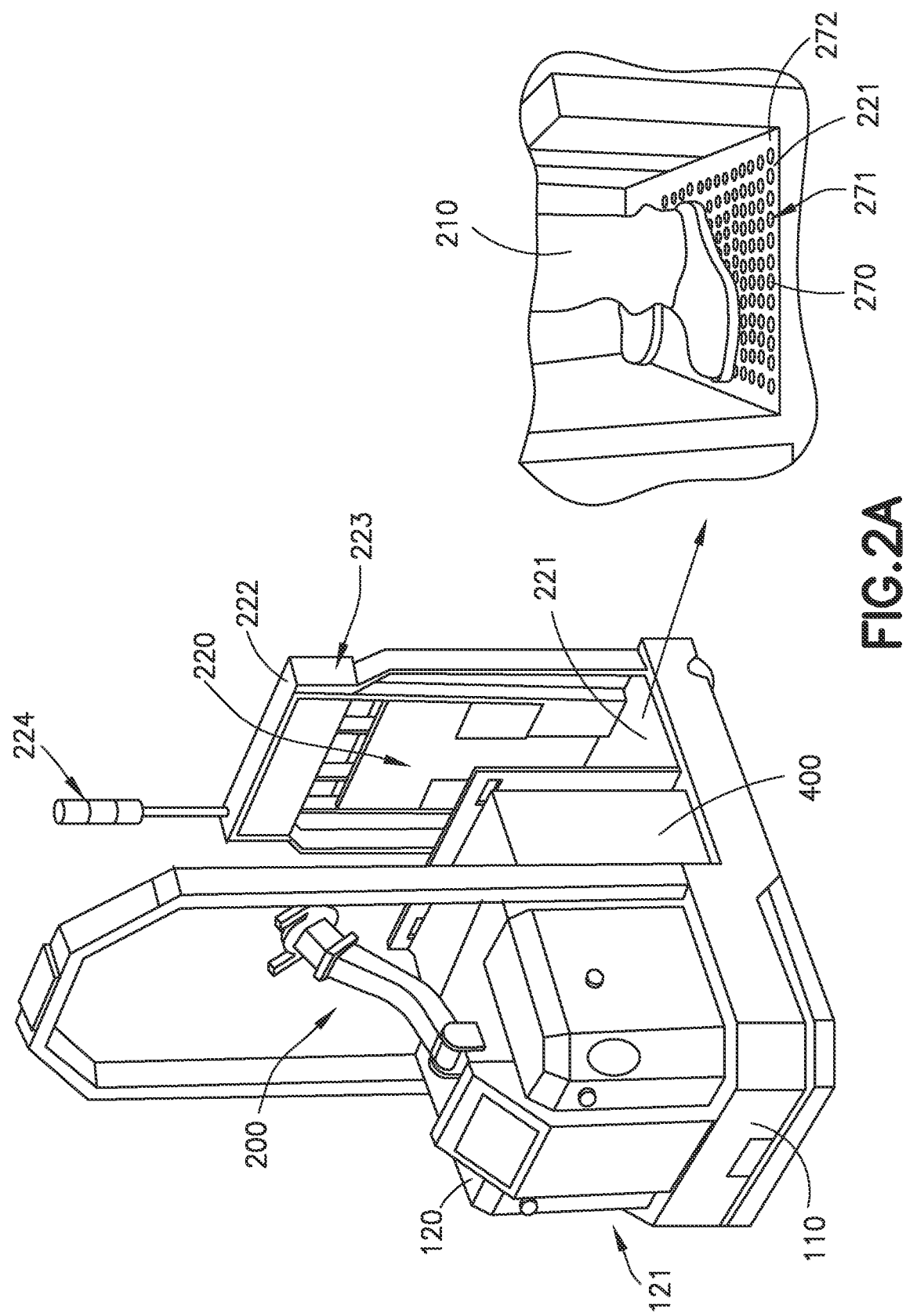
FIG. 2A is a perspective illustration of the autonomous guided vehicle of FIG. 1 in a modular configuration in accordance with aspects of the disclosed embodiment.

Referring also to FIGS. 2A-2C, where the autonomous guided vehicle 100 is to be, at times, controlled or at least partially controlled by an operator 210, the removable input-output device 200 is coupled to autonomous guided vehicle 100), such as to the module housing 120, and control system 113 of the module unit 121 (FIG. 9, Block 925). The control system 113 is changed from autonomous navigation intrinsic to the module unit 121 to operator assisted or operator controlled navigation (FIG. 9, Block 930) such as when an operator 210 is detected onboard the autonomous guided vehicle 100 or in any other suitable manner (such as through operator input at the operator interface 170).

In accordance with one or more aspects of the disclosed embodiment a configurable modular robotic autonomous guided vehicle comprises:

a robotic autonomous guided vehicle engine module with motors, sensors and a control system integrated with each other for autonomous navigation freely throughout a travel area forming a logistic space, the integrated motors, sensors and control system being packaged within a module housing forming the robotic autonomous guided vehicle engine module as a module unit, and having a module interface at one end of the module unit for modular coupling of the module unit with a logistic or material handling accessory module of the configurable modular autonomous guided vehicle; and multiple different ones of the logistic or material handling accessory module, each with a corresponding different predetermined logistic or material handling characteristic that on integral coupling, of each different logistic or material handling accessory module, with the module unit define a different logistic or material handling autonomous guided vehicle type, each of the different logistic or material handling accessory modules being selectably interchangeable with each other and configured to selectably couple via the module interface with module unit;

wherein selectable coupling of the logistic or material handling accessory module with the module unit configures the configurable modular robotic autonomous guided vehicle so as to change the logistic or material handling autonomous guided vehicle type from a first logistic or material handling autonomous guided vehicle type to a second logistic or material handling autonomous guided vehicle type different than the first logistic or material handling autonomous guided vehicle type.

In accordance with one or more aspects of the disclosed embodiment the control system has a controller configured with different predetermined autonomous navigation programming having different predetermined autonomous navigation characteristics corresponding to the logistic or material handling autonomous guided vehicle type.

In accordance with one or more aspects of the disclosed embodiment the controller is configured to automatically register the logistic or material handling accessory module coupled with the module interface, and the logistic or material handling autonomous guided vehicle type configured with the module interface, and access a corresponding autonomous navigation program for the logistic or material handling autonomous guided vehicle type registered.

In accordance with one or more aspects of the disclosed embodiment the module unit is configured to define an integral predetermined logistic or material handling characteristic, different from the corresponding logistic or material handling characteristics of each of the logistic or material handling accessory modules, that defines another logistic or material handling autonomous guided vehicle type different from each of the logistic or material handling autonomous guided vehicle types defined from coupling respective logistic or material handling accessory modules with the module unit.

In accordance with one or more aspects of the disclosed embodiment the other logistic or material handling autonomous guided vehicle type is a tugger autonomous guided vehicle.

In accordance with one or more aspects of the disclosed embodiment the module housing and control system of the module unit is configurable so as to couple a removable input-output device configured for operator control of the configurable modular robotic autonomous guided vehicle, and changing the control system from autonomous navigation intrinsic to the module unit to operator assisted or operator controlled navigation.

In accordance with one or more aspects of the disclosed embodiment the first logistic or material handling autonomous guided vehicle type is a tugger autonomous guided vehicle.

In accordance with one or more aspects of the disclosed embodiment at least one of the logistic or material handling accessory modules has a corresponding predetermined logistic or material handling characteristic that defines a car assembly mover autonomous guided vehicle type.

In accordance with one or more aspects of the disclosed embodiment at least one of the logistic or material handling accessory modules has a corresponding predetermined logistic or material handling characteristic that defines a logistic unit load roller bed autonomous guided vehicle type.

In accordance with one or more aspects of the disclosed embodiment at least one of the logistic or material handling accessory modules has a corresponding predetermined logistic or material handling characteristic that defines a pallet fork lift-truck autonomous guided vehicle type.

In accordance with one or more aspects of the disclosed embodiment at least one of the logistic or material handling accessory modules has a corresponding predetermined logistic or material handling characteristic that defines a high bay pallet lift-truck autonomous guided vehicle type.

In accordance with one or more aspects of the disclosed embodiment at least one of the logistic or material handling accessory modules has a corresponding predetermined logistic or material handling characteristic that defines a pallet jack autonomous guided vehicle type.

In accordance with one or more aspects of the disclosed embodiment a method for transporting logistics units with a configurable modular robotic autonomous guided vehicle is provided. The method comprises:

providing a robotic autonomous guided vehicle engine module, the robotic autonomous guided vehicle engine module including motors, sensors and a control system integrated with each other for autonomous navigation freely throughout a travel area forming a logistic space, the integrated motors, sensors and control system being packaged within a module housing forming the robotic autonomous guided vehicle engine module as a module unit, and having a module interface at one end of the module unit for modular coupling of the module unit with a logistic or material handling accessory module of the configurable modular autonomous guided vehicle;

providing multiple different ones of the logistic or material handling accessory module, each with a corresponding different predetermined logistic or material handling characteristic that on integral coupling, of each different logistic or material handling accessory module, with the module unit define a different logistic or material handling autonomous guided vehicle type, each of the different logistic or material handling accessory modules being selectably interchangeable with each other and configured to selectably couple via the module interface with module unit; and configuring the configurable modular robotic autonomous guided vehicle by selectably coupling one of the logistic or material handling accessory module with the module unit so as to change the logistic or material handling autonomous guided vehicle type from a first logistic or material handling autonomous guided vehicle type to a second logistic or material handling autonomous guided vehicle type different than the first logistic or material handling autonomous guided vehicle type.

In accordance with one or more aspects of the disclosed embodiment the control system has a controller configured with different predetermined autonomous navigation programming having different predetermined autonomous navigation characteristics corresponding to the logistic or material handling autonomous guided vehicle type.

In accordance with one or more aspects of the disclosed embodiment the method further comprises:

automatically registering, with the controller, the logistic or material handling accessory module coupled with the module interface, and the logistic or material handling autonomous guided vehicle type configured with the module interface; and automatically accessing, with the controller, a corresponding autonomous navigation program for the logistic or material handling autonomous guided vehicle type registered.

In accordance with one or more aspects of the disclosed embodiment the module unit is configured to define an integral predetermined logistic or material handling characteristic, different from the corresponding logistic or material handling characteristics of each of the logistic or material handling accessory modules, that defines another logistic or material handling autonomous guided vehicle type different from each of the logistic or material handling autonomous guided vehicle types defined from coupling respective logistic or material handling accessory modules with the module unit.

In accordance with one or more aspects of the disclosed embodiment the other logistic or material handling autonomous guided vehicle type is a tugger autonomous guided vehicle.

In accordance with one or more aspects of the disclosed embodiment the method further comprises:

coupling a removable input-output device to the module housing and control system of the module unit, the removable input-output device being configured for operator control of the configurable modular robotic autonomous guided vehicle; and changing the control system from autonomous navigation intrinsic to the module unit to operator assisted or operator controlled navigation.

In accordance with one or more aspects of the disclosed embodiment the first logistic or material handling autonomous guided vehicle type is a tugger autonomous guided vehicle.

In accordance with one or more aspects of the disclosed embodiment at least one of the logistic or material handling accessory modules has a corresponding predetermined logistic or material handling characteristic that defines a car assembly mover autonomous guided vehicle type.

In accordance with one or more aspects of the disclosed embodiment at least one of the logistic or material handling accessory modules has a corresponding predetermined logistic or material handling characteristic that defines a logistic unit load roller bed autonomous guided vehicle type.

In accordance with one or more aspects of the disclosed embodiment at least one of the logistic or material handling accessory modules has a corresponding predetermined logistic or material handling characteristic that defines a pallet fork lift-truck autonomous guided vehicle type.

In accordance with one or more aspects of the disclosed embodiment at least one of the logistic or material handling accessory modules has a corresponding predetermined logistic or material handling characteristic that defines a high bay pallet lift-truck autonomous guided vehicle type.

In accordance with one or more aspects of the disclosed embodiment at least one of the logistic or material handling accessory modules has a corresponding predetermined logistic or material handling characteristic that defines a pallet jack autonomous guided vehicle type.

In accordance with one or more aspects of the disclosed embodiment a commercial logistic facility comprises:

material handling stations; and at least one configurable modular robotic autonomous guided vehicle configured for transporting logistics units from one material handling station to another material handling station, each of the at least one configurable modular robotic autonomous guided vehicle including:

a robotic autonomous guided vehicle engine module with motors, sensors and a control system integrated with each other for autonomous navigation freely throughout a travel area forming a logistic space, the integrated motors, sensors and control system being packaged within a module housing forming the robotic autonomous guided vehicle engine module as a module unit, and having a module interface at one end of the module unit for modular coupling of the module unit with a logistic or material handling accessory module of the configurable modular autonomous guided vehicle; and multiple different ones of the logistic or material handling accessory module, each with a corresponding different predetermined logistic or material handling characteristic that on integral coupling, of each different logistic or material handling accessory module, with the module unit define a different logistic or material handling autonomous guided vehicle type, each of the different logistic or material handling accessory modules being selectably interchangeable with each other and configured to selectably couple via the module interface with module unit;

wherein selectable coupling of the logistic or material handling accessory module with the module unit configures the configurable modular robotic autonomous guided vehicle so as to change the logistic or material handling autonomous guided vehicle type from a first logistic or material handling autonomous guided vehicle type to a second logistic or material handling autonomous guided vehicle type different than the first logistic or material handling autonomous guided vehicle type.

In accordance with one or more aspects of the disclosed embodiment the control system has a controller configured with different predetermined autonomous navigation programming having different predetermined autonomous navigation characteristics corresponding to the logistic or material handling autonomous guided vehicle type.

In accordance with one or more aspects of the disclosed embodiment the controller is configured to automatically register the logistic or material handling accessory module coupled with the module interface, and the logistic or material handling autonomous guided vehicle type configured with the module interface, and access a corresponding autonomous navigation program for the logistic or material handling autonomous guided vehicle type registered.

In accordance with one or more aspects of the disclosed embodiment the module unit is configured to define an integral predetermined logistic or material handling characteristic, different from the corresponding logistic or material handling characteristics of each of the logistic or material handling accessory modules, that defines another logistic or material handling autonomous guided vehicle type different from each of the logistic or material handling autonomous guided vehicle types defined from coupling respective logistic or material handling accessory modules with the module unit.

In accordance with one or more aspects of the disclosed embodiment the other logistic or material handling autonomous guided vehicle type is a tugger autonomous guided vehicle.

In accordance with one or more aspects of the disclosed embodiment the module housing and control system of the module unit is configurable so as to couple a removable input-output device configured for operator control of the configurable modular robotic autonomous guided vehicle, and changing the control system from autonomous navigation intrinsic to the module unit to operator assisted or operator controlled navigation.

In accordance with one or more aspects of the disclosed embodiment the first logistic or material handling autonomous guided vehicle type is a tugger autonomous guided vehicle.

In accordance with one or more aspects of the disclosed embodiment at least one of the logistic or material handling accessory modules has a corresponding predetermined logistic or material handling characteristic that defines a car assembly mover autonomous guided vehicle type.

In accordance with one or more aspects of the disclosed embodiment at least one of the logistic or material handling accessory modules has a corresponding predetermined logistic or material handling characteristic that defines a logistic unit load roller bed autonomous guided vehicle type.

In accordance with one or more aspects of the disclosed embodiment at least one of the logistic or material handling accessory modules has a corresponding predetermined logistic or material handling characteristic that defines a pallet fork lift-truck autonomous guided vehicle type.

In accordance with one or more aspects of the disclosed embodiment at least one of the logistic or material handling accessory modules has a corresponding predetermined logistic or material handling characteristic that defines a high bay pallet lift-truck autonomous guided vehicle type.

In accordance with one or more aspects of the disclosed embodiment at least one of the logistic or material handling accessory modules has a corresponding predetermined logistic or material handling characteristic that defines a pallet jack autonomous guided vehicle type.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the invention.

What is claimed is:

1. A configurable modular robotic autonomous guided vehicle comprising:
   a robotic autonomous guided vehicle engine module including: motors, sensors, and a control system, wherein the motors, sensors, and control system are integrated with each other to provide autonomous navigation of the robotic autonomous guided vehicle freely throughout a travel area, the travel area forming a logistic space;
   wherein the integrated motors, sensors, and control system of the robotic autonomous guided vehicle engine module are packaged within a module housing to comprise a module unit; and
   the configurable modular robotic autonomous guided vehicle further comprising:
      multiple different logistic or material handling accessory modules, each logistic or material handling accessory module including a corresponding different predetermined logistic or material handling characteristic, wherein with the module unit is coupled to a selected one of the different logistic or material handling accessory modules, a type of logistic or material handling autonomous guided vehicle is defined;
   wherein, the module unit has a module interface at one end to provide modular coupling of the module unit with one of the different logistic or material handling accessory modules, each of the different logistic or material handling accessory modules being selectably interchangeable with each other, and the different logistic or material handling accessory modules are further configured to selectably couple to the module unit via the module interface;
   wherein by selectably coupling a selected one of the different logistic or material handling accessory modules to the module unit, a type of the configurable modular robotic autonomous guided vehicle is changed from a first logistic or material handling autonomous guided vehicle type to a second logistic or material handling autonomous guided vehicle type different than the first logistic or material handling autonomous guided vehicle type.

2. The configurable modular robotic autonomous guided vehicle of claim 1, wherein the control system has a controller that is configured with different predetermined autonomous navigation programming, the different predetermined autonomous navigation programming having different predetermined autonomous navigation characteristics corresponding to the logistic or material handling autonomous guided vehicle type.

3. The configurable modular robotic autonomous guided vehicle of claim 2, wherein the controller is further configured to:
   automatically register the logistic or material handling accessory module that is coupled to the configurable modular robotic autonomous guided vehicle via the module interface, and the logistic or material handling autonomous guided vehicle type, and
   access a corresponding autonomous navigation program for the logistic or material handling autonomous guided vehicle type that is registered.

4. The configurable modular robotic autonomous guided vehicle of claim 1, wherein the module unit is configured to define an integral predetermined logistic or material handling characteristic, the integral predetermined logistic or material handling characteristic being different from the corresponding logistic or material handling characteristics of each of the different logistic or material handling accessory modules, and the integral predetermined logistic or material handling characteristic defines another logistic or material handling autonomous guided vehicle type different from each of the logistic or material handling autonomous guided vehicle types defined from coupling respective logistic or material handling accessory modules with the module unit.

5. The configurable modular robotic autonomous guided vehicle of claim 4, wherein the other logistic or material handling autonomous guided vehicle type is a tugger autonomous guided vehicle.

6. The configurable modular robotic autonomous guided vehicle of claim 4, wherein the module housing and control system of the module unit are configured to couple with a removable input-output device, the removable input-output device is configured for operator control of the configurable modular robotic autonomous guided vehicle, and change the control system from autonomous navigation that is intrinsic to the module unit to operator assisted or operator controlled navigation.

7. The configurable modular robotic autonomous guided vehicle of claim 1, wherein the first logistic or material handling autonomous guided vehicle type is a tugger autonomous guided vehicle.

8. The configurable modular robotic autonomous guided vehicle of claim 1, wherein at least one of the logistic or material handling accessory modules has a corresponding predetermined logistic or material handling characteristic that defines a car assembly mover autonomous guided vehicle type.

9. The configurable modular robotic autonomous guided vehicle of claim 1, wherein at least one of the logistic or material handling accessory modules has a corresponding predetermined logistic or material handling characteristic that defines a logistic unit load roller bed autonomous guided vehicle type.

10. The configurable modular robotic autonomous guided vehicle of claim 1, wherein at least one of the logistic or material handling accessory modules has a corresponding predetermined logistic or material handling characteristic that defines a pallet fork lift-truck autonomous guided vehicle type.

11. The configurable modular robotic autonomous guided vehicle of claim 1, wherein at least one of the logistic or material handling accessory modules has a corresponding predetermined logistic or material handling characteristic that defines a high bay pallet lift-truck autonomous guided vehicle type.

12. The configurable modular robotic autonomous guided vehicle of claim 1, wherein at least one of the logistic or material handling accessory modules has a corresponding predetermined logistic or material handling characteristic that defines a pallet jack autonomous guided vehicle type.

13. A method for transporting logistics units with a configurable modular robotic autonomous guided vehicle, the method comprising:
providing a robotic autonomous guided vehicle engine module, the robotic autonomous guided vehicle engine module including: motors, sensors, and a control system that are integrated with each other to provide autonomous navigation of the configurable modular robotic autonomous guided vehicle freely throughout a travel area, the travel area forming a logistic space, wherein:
the integrated motors, sensors, and control system of the robotic autonomous guided vehicle engine module are packaged within a module housing to form a module unit,
the module unit has a module interface at one end of the module unit for modular coupling of the module unit with a selected one of multiple, different logistic or material handling accessory modules of the configurable modular autonomous guided vehicle,
each of the multiple, different logistic or material handling accessory modules being configured with a corresponding different predetermined logistic or material handling characteristic, and each of the different logistic or material handling accessory modules being selectably interchangeable with each other and configured to selectably couple to the module unit via the module interface, and
with the module unit of the modular robotic autonomous guided vehicle coupled to a selected one of the different logistic or material handling accessory modules, a type of logistic or material handling autonomous guided vehicle is defined; and
configuring the configurable modular robotic autonomous guided vehicle by selectably coupling one of the different logistic or material handling accessory modules to the module unit so as to change the logistic or material handling autonomous guided vehicle type from a first logistic or material handling autonomous guided vehicle type to a second logistic or material handling autonomous guided vehicle type different than the first logistic or material handling autonomous guided vehicle type.

14. The method of claim 13, wherein the control system has a controller that is configured with different predetermined autonomous navigation programming, the different predetermined autonomous navigation programming having different predetermined autonomous navigation characteristics corresponding to the logistic or material handling autonomous guided vehicle type.

15. The method of claim 14, further comprising:
automatically registering, with the controller, the logistic or material handling accessory module coupled to the configurable modular robotic autonomous guided vehicle via the module interface, and the logistic or material handling autonomous guided vehicle type; and
automatically accessing, with the controller, a corresponding autonomous navigation program for the logistic or material handling autonomous guided vehicle type registered.

16. The method of claim 13, wherein the module unit is configured to define an integral predetermined logistic or material handling characteristic, the integral predetermined logistic or material handling characteristic being different from the corresponding logistic or material handling characteristics of each of the logistic or material handling accessory modules, and the integral predetermined logistic or material handling characteristic defines another logistic or material handling autonomous guided vehicle type different from each of the logistic or material handling autonomous guided vehicle types defined from coupling respective logistic or material handling accessory modules with the module unit.

17. The method of claim 16, wherein the other logistic or material handling autonomous guided vehicle type is a tugger autonomous guided vehicle.

18. The method of claim 16, further comprising:
coupling a removable input-output device to the module housing and control system of the module unit, the removable input-output device being configured for operator control of the configurable modular robotic autonomous guided vehicle; and
changing the control system from autonomous navigation that is intrinsic to the module unit, to operator assisted or operator controlled navigation.

19. The method of claim 13, wherein the first logistic or material handling autonomous guided vehicle type is a tugger autonomous guided vehicle.

20. The method of claim 13, wherein at least one of the logistic or material handling accessory modules has a corresponding predetermined logistic or material handling characteristic that defines a car assembly mover autonomous guided vehicle type.

21. The method of claim 13, wherein at least one of the logistic or material handling accessory modules has a corresponding predetermined logistic or material handling characteristic that defines a logistic unit load roller bed autonomous guided vehicle type.

22. The method of claim 13, wherein at least one of the logistic or material handling accessory modules has a corresponding predetermined logistic or material handling characteristic that defines a pallet fork lift-truck autonomous guided vehicle type.

23. The method of claim 13, wherein at least one of the logistic or material handling accessory modules has a corresponding predetermined logistic or material handling characteristic that defines a high bay pallet lift-truck autonomous guided vehicle type.

24. The method of claim 13, wherein at least one of the logistic or material handling accessory modules has a corresponding predetermined logistic or material handling characteristic that defines a pallet jack autonomous guided vehicle type.

25. A commercial logistic facility comprising:
material handling stations; and
at least one configurable modular robotic autonomous guided vehicle configured for transporting logistics units from one material handling station to another material handling station, each of the at least one configurable modular robotic autonomous guided vehicle including:
a robotic autonomous guided vehicle engine module including: motors, sensors, and a control system, wherein the motors, sensors, and control system are integrated with each other to provide autonomous navigation of the at least one configurable modular robotic autonomous guided vehicle freely throughout a travel area, the travel area forming a logistic space;

wherein the integrated motors, sensors, and control system of the robotic autonomous guided vehicle engine module are packaged within a module housing to comprise a module unit; and the at least one configurable modular robotic autonomous guided vehicle further comprising:

multiple different logistic or material handling accessory modules, each logistic or material handling accessory module including a corresponding different predetermined logistic or material handling characteristic, wherein with the module unit is coupled to a selected one of the different logistic or material handling accessory modules, a type of logistic or material handling autonomous guided vehicle is defined;

wherein, the module unit has a module interface at one end to provide modular coupling of the module unit with one of the different logistic or material handling accessory modules, each of the different logistic or material handling accessory modules being selectably interchangeable with each other, and the different logistic or material handling accessory modules are further configured to selectably couple to the module unit via the module interface;

wherein by selectably coupling a selected one of the different logistic or material handling accessory modules to the module unit, a type of the configurable modular robotic autonomous guided vehicle is changed from a first logistic or material handling autonomous guided vehicle type to a second logistic or material handling autonomous guided vehicle type different than the first logistic or material handling autonomous guided vehicle type.

26. The commercial logistic facility of claim 25, wherein the control system has a controller that is configured with different predetermined autonomous navigation programming, the different predetermined autonomous navigation programming having different predetermined autonomous navigation characteristics corresponding to the logistic or material handling autonomous guided vehicle type.

27. The commercial logistic facility of claim 26, wherein the controller is further configured to:

automatically register the logistic or material handling accessory module that is coupled with to the at least one configurable modular robotic autonomous guided vehicle via the module interface, and the logistic or material handling autonomous guided vehicle type, and access a corresponding autonomous navigation program for the logistic or material handling autonomous guided vehicle type registered.

28. The commercial logistic facility of claim 25, wherein the module unit is configured to define an integral predetermined logistic or material handling characteristic, the integral predetermined logistic or material handling characteristic being different from the corresponding logistic or material handling characteristics of each of the logistic or material handling accessory modules, and integral predetermined logistic or material handling characteristic defines another logistic or material handling autonomous guided vehicle type different from each of the logistic or material handling autonomous guided vehicle types defined from coupling respective logistic or material handling accessory modules with the module unit.

29. The commercial logistic facility of claim 28, wherein the other logistic or material handling autonomous guided vehicle type is a tugger autonomous guided vehicle.

30. The commercial logistic facility of claim 28, wherein the module housing and control system of the module unit is configurable so as to couple a removable input-output device configured for operator control of the configurable modular robotic autonomous guided vehicle, and changing the control system from autonomous navigation that is intrinsic to the module unit, to operator assisted or operator controlled navigation.

31. The commercial logistic facility of claim 25, wherein the first logistic or material handling autonomous guided vehicle type is a tugger autonomous guided vehicle.

32. The commercial logistic facility of claim 25, wherein at least one of the logistic or material handling accessory modules has a corresponding predetermined logistic or material handling characteristic that defines a car assembly mover autonomous guided vehicle type.

33. The commercial logistic facility of claim 25, wherein at least one of the logistic or material handling accessory modules has a corresponding predetermined logistic or material handling characteristic that defines a logistic unit load roller bed autonomous guided vehicle type.

34. The commercial logistic facility of claim 25, wherein at least one of the logistic or material handling accessory modules has a corresponding predetermined logistic or material handling characteristic that defines a pallet fork lift-truck autonomous guided vehicle type.

35. The commercial logistic facility of claim 25, wherein at least one of the logistic or material handling accessory modules has a corresponding predetermined logistic or material handling characteristic that defines a high bay pallet lift-truck autonomous guided vehicle type.

36. The commercial logistic facility of claim 25, wherein at least one of the logistic or material handling accessory modules has a corresponding predetermined logistic or material handling characteristic that defines a pallet jack autonomous guided vehicle type.

* * * * *